United States Patent [19]

Katoh et al.

[11] Patent Number: 5,436,682
[45] Date of Patent: Jul. 25, 1995

[54] PHOTOGRAPHED IMAGE REPRODUCTION APPARATUS

[75] Inventors: Takehiro Katoh, Nara; Kyoko Kakudo, Osaka; Tetsuo Yamada, Toyonaka, all of Japan

[73] Assignee: Minolta Camera Kabushiki Kaisha, Osaka, Japan

[21] Appl. No.: 101,976

[22] Filed: Aug. 4, 1993

[30] Foreign Application Priority Data

Aug. 10, 1992 [JP] Japan .................. 4-213037
Aug. 10, 1992 [JP] Japan .................. 4-213038

[51] Int. Cl.⁶ ............................. G03B 31/04
[52] U.S. Cl. ............................. 353/15; 352/19
[58] Field of Search ............ 353/15, 19, 25, 26 R, 353/26 A; 348/512, 515; 352/12, 19, 20, 21, 22, 25, 26

[56] References Cited

U.S. PATENT DOCUMENTS

| | | | |
|---|---|---|---|
| 3,539,248 | 11/1970 | Lancor | 352/19 |
| 3,748,027 | 7/1973 | Beck et al. | 352/20 |
| 3,922,078 | 11/1975 | Uchidoi et al. | 353/15 |
| 4,027,958 | 6/1977 | Shigeta | 353/15 |
| 4,066,963 | 1/1978 | Takahashi et al. | 352/12 |
| 4,097,135 | 6/1978 | Castor | 353/15 |
| 4,165,159 | 8/1979 | Landau et al. | 353/15 |
| 4,482,924 | 11/1984 | Brownstein | 358/302 |
| 4,757,374 | 7/1988 | Ramsay et al. | 355/40 |

FOREIGN PATENT DOCUMENTS

| | | |
|---|---|---|
| 0410376 | 1/1991 | European Pat. Off. . |
| 4117048 | 11/1991 | Germany . |
| 3-127043 | 5/1991 | Japan . |
| 3-185680 | 8/1991 | Japan . |
| 4-28056 | 1/1992 | Japan . |
| 4-3352 | 2/1992 | Japan . |
| 2174568 | 11/1986 | United Kingdom . |
| WO90/04301 | 4/1990 | WIPO . |

Primary Examiner—William A. Cuchlinski, Jr.
Assistant Examiner—William C. Dowling
Attorney, Agent, or Firm—Burns, Doane, Swecker & Mathis

[57] ABSTRACT

A photographed image reproduction apparatus for reproducing photographed images recorded on a film includes an image reproducer for reproducing an image on the film, a music player for playing a music suitable for the image, and controller for controlling the image reproducer and the music player so as to execute the image reproduction and the music play coincidentally. The controller has a calculator device for calculating an image reproduction time and a selector device for selecting a music suitable for a reproduced image among a repertoire of musics.

10 Claims, 22 Drawing Sheets

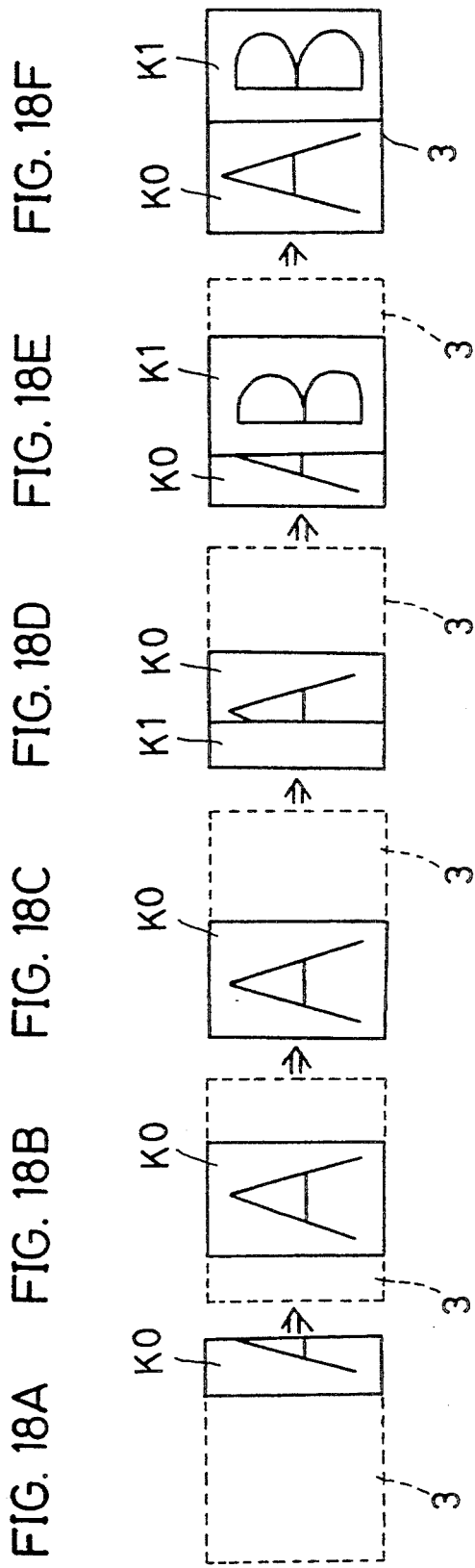

FIG. 22A
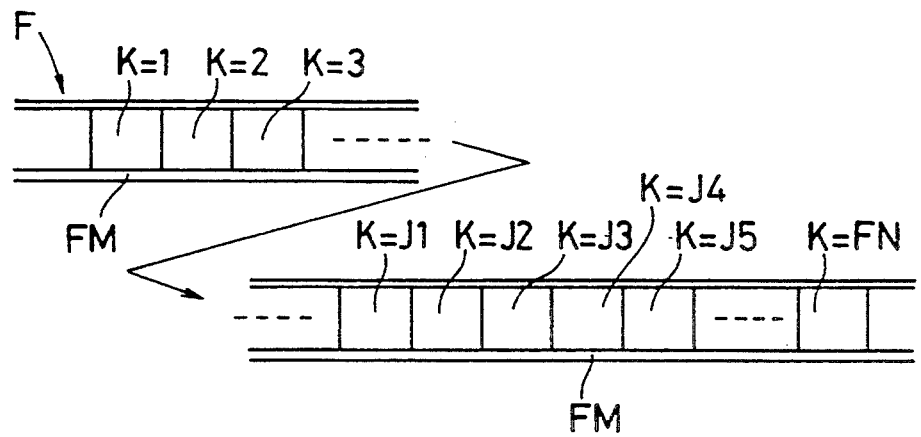
FIG. 22B
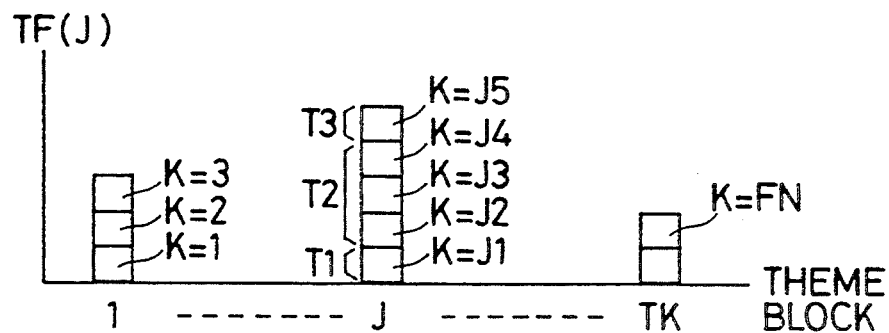
FIG. 22C
| ADD-RESS | FRAME NO. | DESIGNATED SECTION NAME | BK(K) |
|---|---|---|---|
| 010 | 1-3 | SUPPLEMENTARY SECTION | 0 |
| ⋮ | ⋮ | ⋮ | ⋮ |
| 100 | J1 | INTRODUCTORY SECTION | 1 |
| 101 | J2-J4 | INTERMEDIARY SECTION | 2 |
| 102 | J5 | TERMINATORY SECTION | 3 |

PHOTOGRAPHED IMAGE REPRODUCTION APPARATUS

BACKGROUND OF THE INVENTION AND RELATED ART STATEMENT

This invention relates to a photographed image reproduction apparatus for reproducing photographed images by the use of an appropriate image display unit.

There have been known a number of photographed images reproduction apparatus which reproduces photographed on a developed film on a monitor TV or other display unit. Some reproduction apparatus among them allow us to manually change the way of displaying photographed images, for example, by zooming and panning.

Also, there have proposed a dramatic presentation of playing a background music together with reproduction of a photographed image on a monitor TV. However, it has been very difficult to render the reproducing time of image coincide with the play time of background music. If the background music ends before or after the reproduction of image, desired dramatic effect will be seen to be muddled.

It is an object of the present invention to provide a photographed image reproduction apparatus which has overcome the above-mentioned conventional problems.

It is another object of-the present invention to provide a photographed image reproduction apparatus which can serve a background music for a reproduced image in a harmonious timing with the reproduction of image.

SUMMARY OF THE INVENTION

Accordingly, the present invention is directed to a reproduction apparatus for reproducing an image recorded on a film comprising: image reproducing means for reproducing the image on the film; music playing means for playing a music suitable for the image; first determining means for determining an image reproduction time for the image reproducing means; and second determining means for determining a music play time for the music playing means corresponding to the image reproduction time determined by the first determining means.

With this construction, an image reproduction is first determined and a music play time is then determined so as to correspond to the image reproduction time.

According to the present invention, also, a reproduction apparatus for reproducing an image recorded on a film comprises: image reproducing means for reproducing the image on the film; music playing means for playing a music suitable for the image; and control means for controlling the image reproducing means and the music playing means so as to execute the image reproduction and the music play in accordance with a predetermined time relationship.

With this construction, the image reproduction time and the music play time are controlled so that an image and a corresponding music are reproduced in accordance with a predetermined time relationship.

According to the present invention, further, a reproduction apparatus for reproducing an image recorded on a film comprises: image reproducing means for reproducing the image on the film; music playing means having a repertoire of a plurality of musics having different play times from one another for playing one music among the repertoire musics each image reproduction; selection means for selecting a music suitable for the image; and determining means for determining an image reproduction time for the image reproducing means in accordance with the play time of a selected music.

With this construction, a music suitable for an image is first selected and the reproduction time for the image then determined so as to correspond to the play time of the selected music.

Accordingly, the reproduction apparatus of the present invention can assure reproduction of an image and a background music suitable for the image in a harmonious and dramatic timing.

The above and other objects features and advantages of the present invention will become more apparent from the following detailed description which is to be read in conjunction with the accompanying drawings.

BRIEF DESCRIPTION OF THE DRAWINGS

FIGS. 18A–18F are diagrams illustrating one example of the rule (A) display presentation;

FIGS. 22A–22C are diagrams illustrating ways of assigning section names; and

DETAILED DESCRIPTION OF THE PREFERRED EMBODIMENTS OF THE INVENTION

Figure 1:
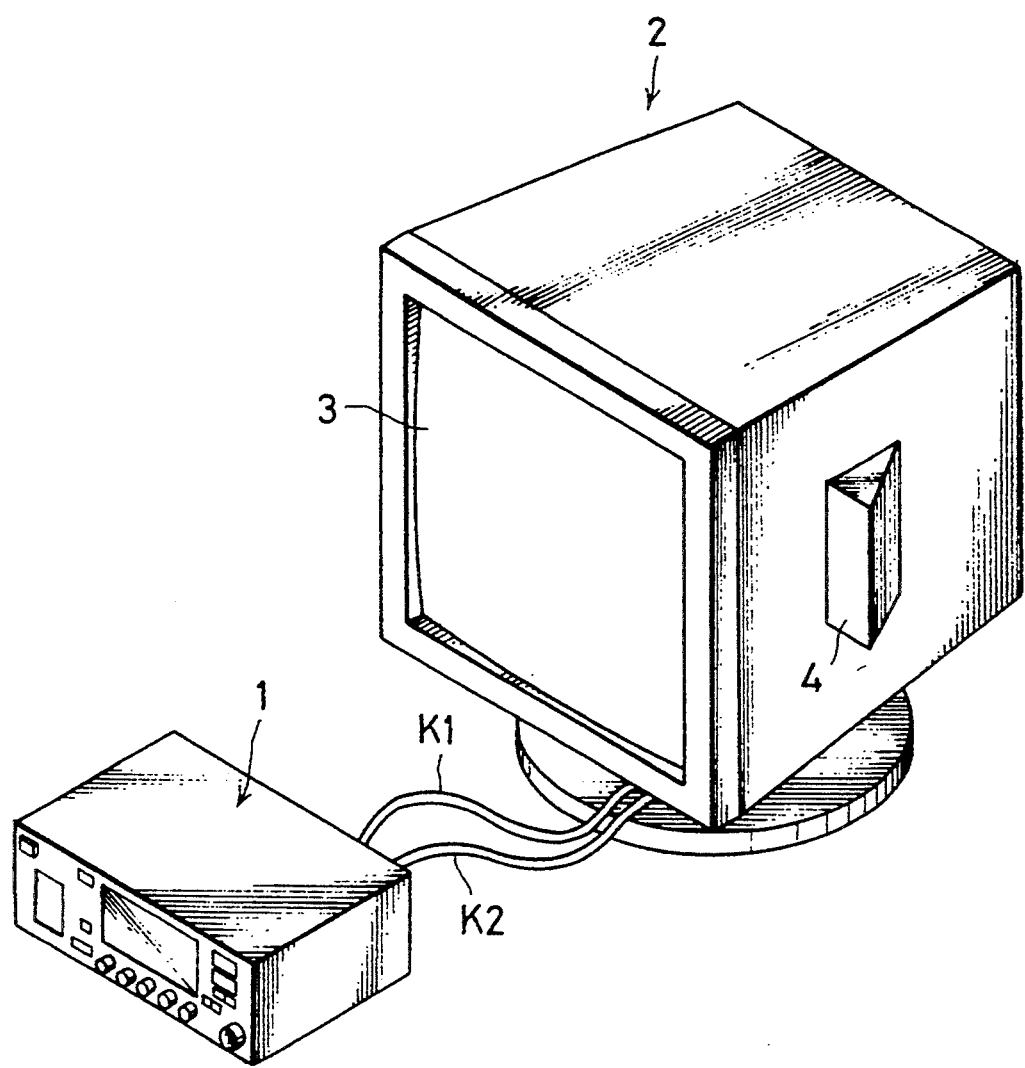
FIG. 1 is a perspective view showing a use state of photographed image reproduction apparatus embodying the present invention.
Figure 2:
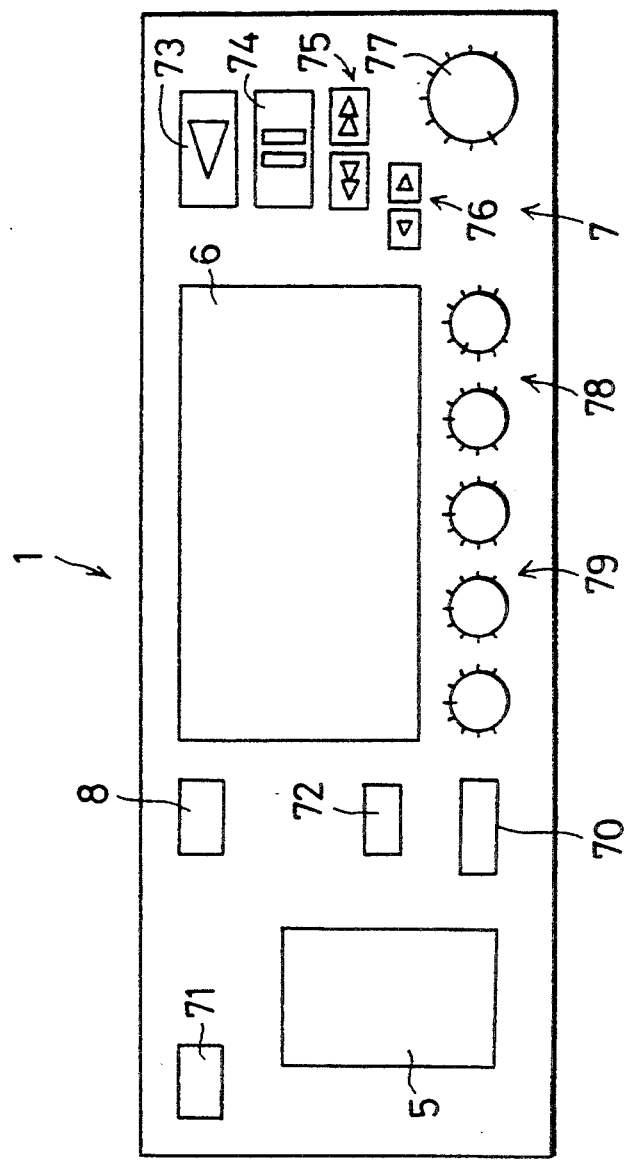
FIG. 2 is a front view of an operation panel provided on a front surface of the photographed image reproduction apparatus.

FIG. 1 is a perspective view showing a photographed image reproduction apparatus in accordance with the present invention. A photographed image reproduction apparatus 1 is connected with a monitor TV 2 through cables K1, K2. The monitor TV 2 has a screen 3 on a front surface thereof. An image on a developed film is reproduced on the screen 3. A pair of speakers 4 are provided on right and left sides of the monitor TV 2 to output background music sounds during the reproduction of the photographed image.

The photographed image reproduction apparatus 1 has a cartridge loading portion 5, a display portion 6, an operation portion 7 and a remote control signal receiving portion 8. The cartridge loading portion 5 serves to load a film cartridge accommodating a developed film therein. The display portion 6 displays various photographic information such as photographing date and magnifying power as well as operational conditions of reproduction apparatus 1.

The operation portion 7 includes a loading switch 70, an electric power switch 71, a presentation way select switch 72, a start switch 73, a stop switch 74, a film feed switch 75, a panning switch 76, a zooming knob 77, a white balance adjust knob 78, and a color balance adjust knob 79. The loading switch 70, when depressed once, initiates ejecting a film cartridge out of the photographed image reproduction apparatus 1. On the contrary, the loading switch 70, when depressed one more time, initiates loading the film cartridge into the film image reproduction apparatus 1. The electric power switch 71 activates the photographed image reproduction apparatus 1.

The presentation way select switch 72 allows an operator to selectively designate either an automatic mode or a manual mode. When the automatic mode is selected, photographed images are automatically reproduced in accordance with predetermined presentation ways stored in the photographed images reproduction apparatus 1. On the other hand, when the manual mode is selected, photographed images are reproduced one by one in response to the operator's manipulation.

The start switch 73 controls the initiation of reproduction. Upon depressing the start switch 73, photographed images are successively supplied to the monitor TV 2 for reproduction. The stop switch 74 stops the reproduction of photographed images. The film feed switch 75 is used in the manual mode to feed photographed images at a more faster speed in a forward or reverse direction.

The panning switch 76 is also used in the manual mode to move photographed images displayed on the screen 3 of the monitor TV 2 horizontally to secure a panoramic effect. The zooming knob 77 will be rotated in the manual mode. Rotating this knob desirably varies the magnifying power of a photographed image reproduced on the screen 3 of the monitor TV 2. The white balance adjust knob 78 is provided for adjustment of the white balance of the photographed image. The color balance adjust knob 79 is also provided for adjustment of the color balance of the photographed images.

Figure 3:
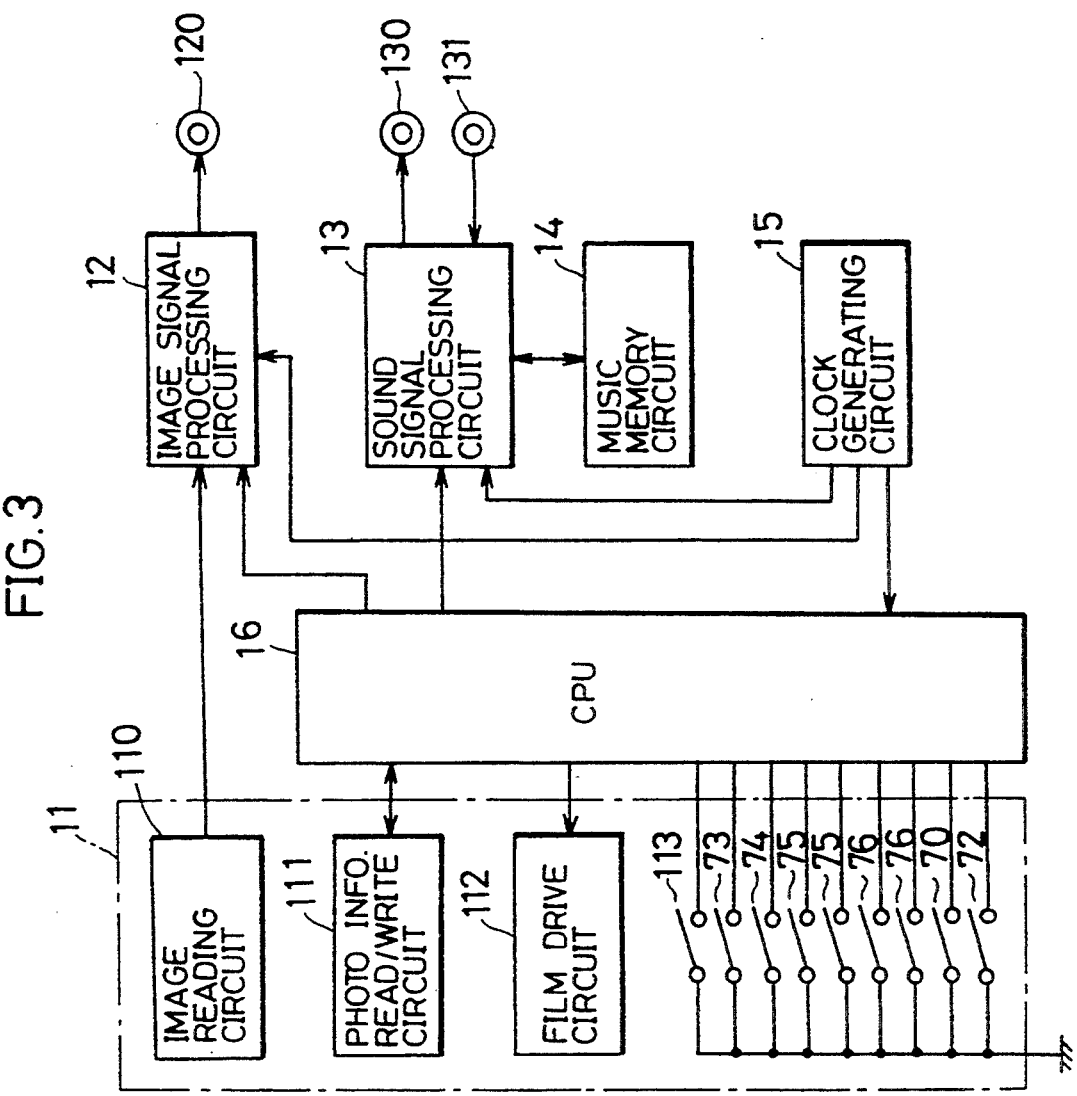
FIG. 3 is a block diagram showing a construction of the photographed image reproduction apparatus.

Next, a circuit configuration of the photographed image reproduction apparatus 1 will be explained with reference to FIG. 3. The photographed image reproduction apparatus 1 comprises an input portion 11, an image signal processing circuit 12, a sound signal processing circuit 13, a music memory circuit 14, a clock generating circuit 15, and a central processing unit (hereinafter, referred to as CPU) 16.

The input portion 11 has various functions. For example, the input portion 11 is associated with the cartridge loading portion 5 to read photographed images from frames of a film housed therein.

Each frame of the film stores number of photographic information relating to photographing date and place, panoramic photograph, camera position (vertical or horizontal) and others. A frame number is also stored together with these photographic information. These information are magnetically recorded in connection with respective frames in a marginal portion extending longitudinally along the frames of the film. Such magnetic storage of photographic information will be able to be replaced by other storage means such as optical recording. A detailed construction of the input portion 11 will be explained later.

The image signal processing circuit 12 is operatively associated with the CPU 16 to process an image signal read by the input portion 11 in accordance with commands fed from the CPU 16. A processed signal from the image signal processing circuit 12, for example, NTSC signal, is outputted through a video output terminal 120. The video output terminal 120 is connected to the monitor TV 2 via the cable K1.

The sound signal processing circuit 13 is also associated with the CPU 16 to select a suitable music among a repertoire of a plurality of musics in accordance with a command fed from the CPU 16. A processed signal from the sound signal processing circuit 13 is outputted through a sound output terminal 130.

Furthermore, the sound signal processing circuit 13 has a music input terminal 131 through which an additional is inputted. The music memory circuit 14 can store such an additional music. Still further, the sound signal processing circuit 13 can respond to a command signal from the CPU 16 to read a desirable music from an external device and output it from the sound signal output terminal 130.

The music memory circuit 14 stores a repertoire consisting of a plurality of musics whose play times are different from each other. The sound signal output terminal 130 is connected to the monitor TV 2 via the cable K2. The clock generating circuit 15 is connected with the image signal processing circuit 12 the sound signal processing circuit 13, and the CPU 16 to send clock signals having a predetermined frequency.

The input portion 11 includes a photographic information read/write circuit 111 and a film drive circuit 112. The CPU 16 not only controls the film drive circuit 112 but reads data from the photographic information read/write circuit 111. In response to the photographic information having been read, the CPU 16 sets an optimum presentation way for reproduction of photographed image of each frame.

The image signal processing circuit 12 and the sound signal processing circuit 13 are controlled in accordance with determined presentation way.

The CPU 16 comprises memory for storing the set presentation way. Moreover, the CPU 16 controls the photographic information read/write circuit 111 to magnetically record the set presentation way on the marginal portion of the film.

The input portion 11 will be explained in more detail. The input portion 11 comprises an image reading circuit 110 and a number of switches, as well as the photographic information read/write circuit 111 and the film drive circuit 112. The switches includes a film loading detecting switch 113 in addition to the previously described various switches 70, and 72–76. The film loading detecting switch 113 detects the presence of the film cartridge loaded in the cartridge loading portion 5.

Figure 5:
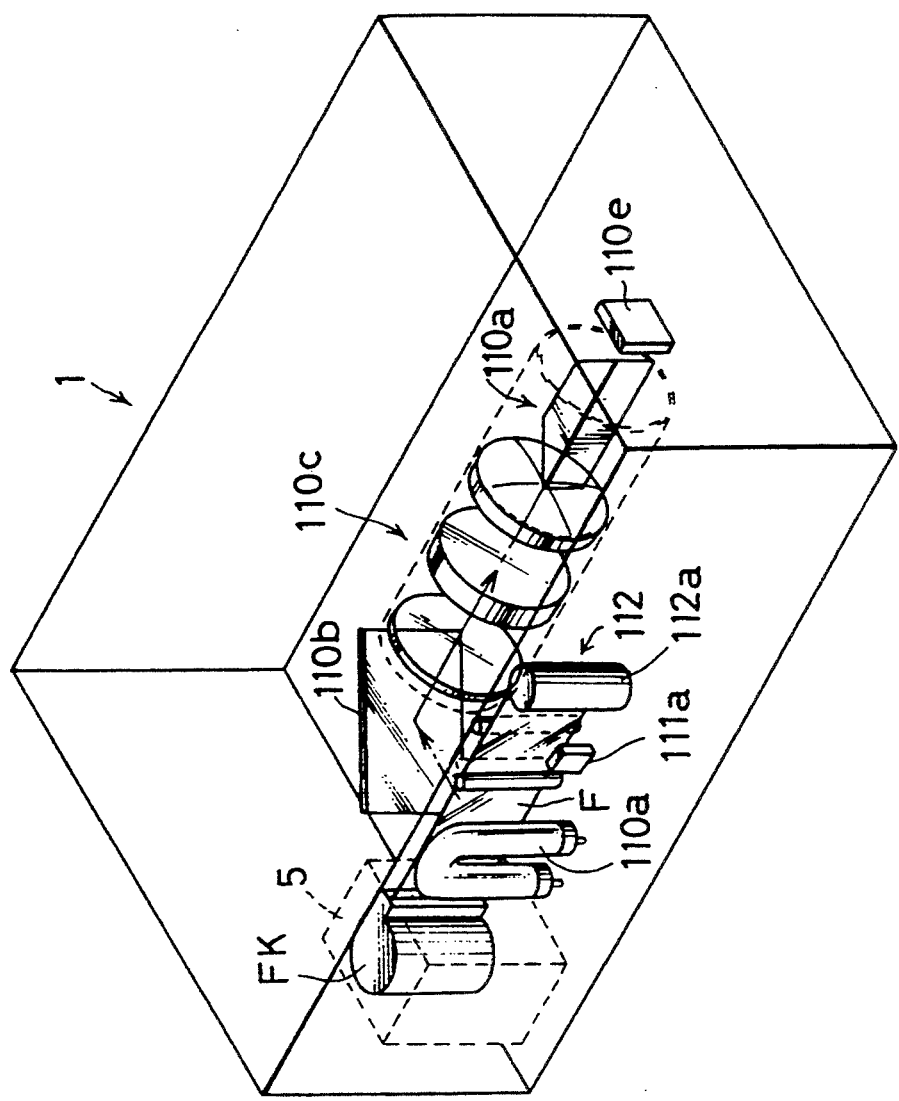
FIG. 5 is a perspective view showing an interior arrangement of the photographed image reproduction apparatus.

As shown in FIG. 5, the image reading circuit 110c comprises a light source 110a, a mirror 110b, a variable power optics 110c including a photographing lens and a diaphragm, a vertical/horizontal converter 110d including a prism, and a sensing device 110e including a CCD (Charge-Coupled Device).

The light source 110a, disposed near the cartridge loading portion 5, emits a light to irradiate a film F extracted from the film cartridge FK. The film F is driven by the film drive circuit 112. The mirror 110b reflects the light having transmitted through the film F toward the variable power optics 110c.

The variable power optics 110c controls the diaphragm (not shown) in accordance with a light Quantity detected by a photometry sensor (not shown) so as to adjust a light quantity to be transmitted to the vertical/horizontal converter 110d. The variable power optics 110c also varies the magnifying power of the photographic lens in response to an operational amount exerted on the zooming knob 77.

The vertical/horizontal converter 110d changes a direction of an image by 90 degrees, so that an image photographed in a vertical camera position can be reproduced in a rightly erected position. The vertical camera position normally defined as a position where a camera stands on its side. On the contrary, a horizontal camera position is defined as a position where a camera stands on its bottom.

The sensing device 110e converts the light image of the film F, transmitted through the variable power optics 110c and the vertical/horizontal converter 110d, into electric signals in response to the light quantity detected by the photometry sensor.

The photographic information read/write circuit 111 is coupled with a magnetic head ilia which magnetically interacts with the marginal portion of the film F to read photographic information and a frame number from each frame. The photographic information read/write circuit 111 is also magnetically engaged with the marginal portion through the magnetic head 111a when the presentation way having being set by the CPU 16 is recorded on this marginal portion.

It is needless to say that, if the photographic information are recorded on the film F in the form of optical signals, the read/write operation would be performed in an optical way. It will be apparent that any other storage mediums such as semiconductor memories and IC memories equipped in the film cartridge FK can be used as the storage means for photographic information.

The film drive circuit 112 drives spool 112a in response to a control signal fed from the CPU 16. A traction force thus given by the spool 112a serves to pull the film F out of the film cartridge FK having been loaded in position in the cartridge loading portion 5. The film F is extracted frame by frame. The film loading detecting switch 113 detects the presence of the film cartridge FK loaded in the cartridge loading portion 5.

Figure 4:
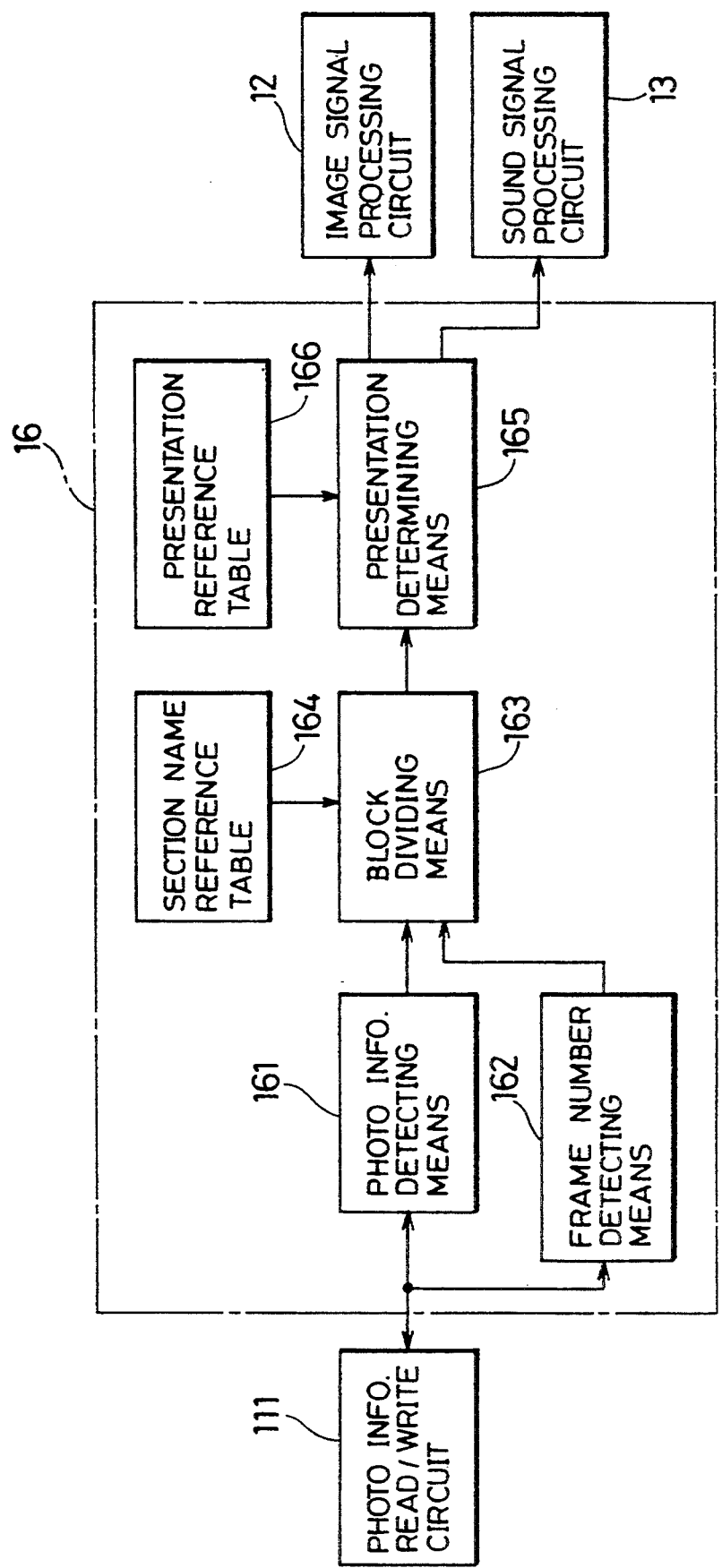
FIG. 4 is a block diagram showing a main portion of the photographed image reproduction apparatus.

Next, a fundamental construction of the CPU 16 will be explained with reference to FIG. 4. The CPU 16 comprises a photographic information detecting means 161, a frame number detecting means 162, a block dividing means 163, a section name reference table 164, a presentation determining means 165, and a presentation reference table 166.

The photographic information detecting means 161 receives the photographic information having been read from each frame of the film F through the photographic information read/write circuit 111. The detected photographic information is then supplied to the block dividing means 163.

The frame number detecting means 162 also receives the information obtained from each frame of the film F and picks up information relating to the frame member and supplies it to the block dividing means 163. The frame number detecting means 162 can make a judgment as to whether or not frames of the film F are already divided or classified into a plurality of theme blocks. Details of the theme blocks will be later described.

The block dividing means 163 having received the information from the photographic information detecting means 161 and the frame number detecting means 162, assigns each of frames of film F to any one of an introductory section, an intermediary section, a terminatory section and a supplementary section by taking account of a content of the section name reference table 164. The section name reference table 164 includes a sort of suggestion for optimizing the assignment of these sections.

The presentation determining means 165 determines a presentation way, i.e., way of providing a display image, with respect to each frame of the film F having been assigned to any one of the introductory, intermediary, terminatory, and supplementary sections. An output signal of the presentation determining means 165 is supplied to both the image signal processing circuit 12 and the sound signal processing circuit 13, so that an image of the film F is reproduced with an appropriate background music in accordance with thus determined presentation way.

The presentation reference table 166 includes several presentation ways stored in advance which are to be referred to set an optimum presentation way.

Next, setting an optimum presentation way will be described with reference to FIG. 6.

The film loading detecting switch 113 detects the presence of the film cartridge FK in the cartridge loading portion 5. In response to this detection signal, the film is pulled out of the film cartridge FK by being driven by the film drive circuit 112. The photographic information. read/write circuit 111 reads all the information recorded on in the film F. The CPU 16 receives the information detected by the frame number detecting means 162 and makes a judgment in Step S1 as to whether or not the frames of the film F are already classified into several theme blocks.

If the film F is not yet divided into theme blocks, the CPU 16 proceeds to Step S3 to classify frames of the film F into several theme blocks. FIGS. 22A and 22B illustrate how the frames (K=1, 2, 3,. . . , FN) of the film F are classified into several theme blocks (1, . . . ,TK) . The theme blocks (1, . . . ,TK) are determined in such a way that a bunch of frames having the common data, the same photographing data, constitutes one theme block. A judgment such as indoor or outdoor, panoramic photography or normal photography, vertical or horizontal in camera position, would be also a preferable factor for determining the theme blocks.

Next, in Step S5, the CPU 16 activates the photographic information read/write circuit 111 to record the information relating to the theme block such as a total number TK of theme blocks and a total frame number TF(j) of each theme block on the marginal portion FM of the film F.

If the judgment in Step S1 is YES, the CPU 16 proceeds to Step S7 to read the theme block information having been already recorded on the marginal portion of the film F and to store it temporarily. The marginal portion FM, longitudinally extending as shown in FIG. 22A, magnetically stores various information therein.

Figure 23A:
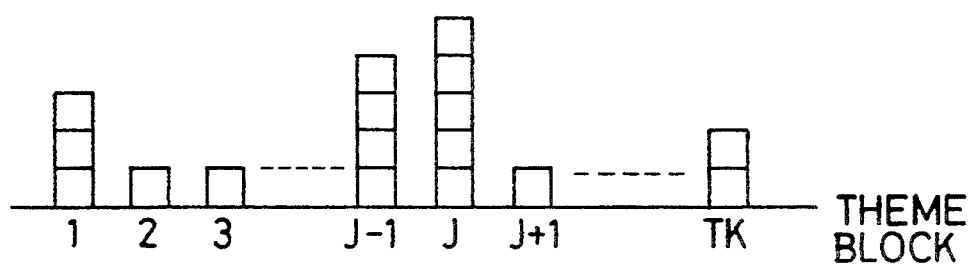
FIGS. 23A and 23B are diagrams illustrating theme blocks and image blocks, respectively.
Figure 23B:
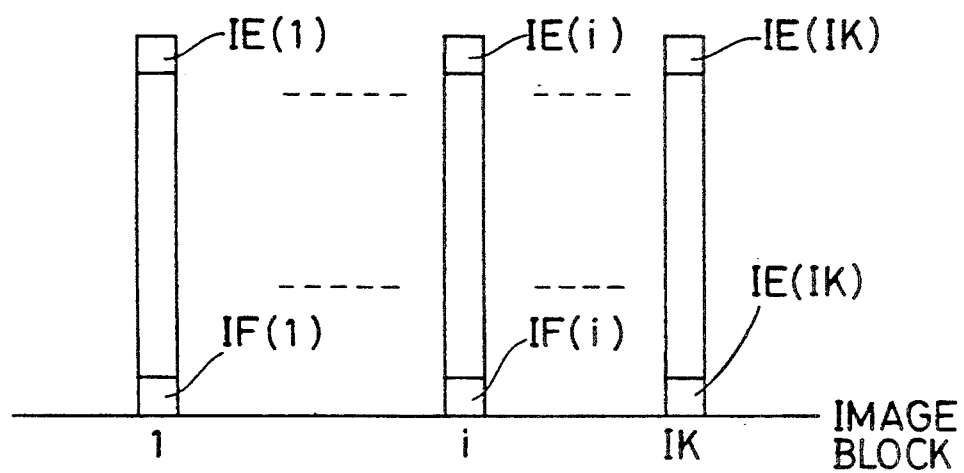

In Step S9, the CPU 16 reassembles frames by taking account of the total frame number TF(J) of each theme block. A plurality of blocks each having a frame number equal to or less than a predetermined value are newly formed by this reassembling. Namely, a theme block would be split into smaller blocks if it contains too much frames and on the contrary, would be integrated with adjacent theme blocks if it contains too less frames, as comparatively illustrated FIGS. 23A and 23B. A total number of the image blocks is stored as IK. Furthermore, first and last frame numbers of each image block (1, 2, . . . , IK) are designated as IF(i) and IE(i). where i; 1, 2, . . . , IK, respectively, as shown in FIG. 23B.

Next in Step S11, the CPU 16 causes the block dividing means 163 to perform a "SECTION NAMING" subroutine later explained. Through this procedure, frames consisting of respective theme blocks are assigned to any one of the introductory section intermediary section, terminatory section and supplementary section. Thereafter, in Step S13, a count value H is reset to "0". This count value H is used in a later-described Step S35 to count how many times a "SINGLE SECTION DISPLAY" subroutine is repeated.

Subsequently, in Step S15, a count value J specifying a number of theme block is set to "1". The CPU 16 then proceeds to Step S17 to make a judgment as to whether or not this count value J exceeds the total number TK of the theme blocks. If the count value J is less than the total number TK, the CPU 16 proceeds to Step S19 to further make a judgment as to whether or not the present theme block is assigned to the supplementary section in Step S11.

If the present theme block is not assigned to the supplementary section, i.e., a small theme block, the CPU 16 proceeds to Step S21 to execute a "RULE (A) DISPLAY" subroutine which will be described later. In turn, the CPU 16 proceeds to Step S23 to execute a "RULE (B) DISPLAY" subroutine which will be also described later.

Thereafter, the CPU 16 proceeds to Step S25 to execute a "SEQUENTIAL SECTION DISPLAY" subroutine which will be also described later. Furthermore, the CPU 16 proceeds to Step S27 to execute a "RULE (C) DISPLAY" subroutine which will be also described later.

Then, in Step S29, the above-described count value H is reset to "0". Subsequently, the CPU 16 proceeds to Step S31 to execute a "FADE/DARK-CHANGE TIME" subroutine which is also described later. After the count value J is incremented in Step S33, the CPU 16 returns to Step S17 to repeat the same procedure with respect to the next theme block.

On the other hand, if the judgment in Step S19 is YES, the CPU 16 proceeds to Step S35 to execute a "SINGLE SECTION DISPLAY" subroutine which will be described later. The count value H is incremented in Step S37 and the CPU 16 proceeds to Step S33.

Returning to Step S17, if the count value J exceeds the total number TK, the CPU 16 proceeds to Step S39 to execute a "MUSIC" subroutine which will be also described later.

The "SECTION NAMING" subroutine will be described in detail hereinafter with reference to a flowchart of FIG. 7. In Step S41, a value K is set to "1". The value K specifies the frame number of the film F. In the same way, the value J which specifies the theme block number is set to "1" in Step S43. The CPU 16 proceeds to Step S45 to make a judgment as to whether or not the value J is equal to or less than the total number TK of the theme blocks. If the judgment in Step S45 is NO, the CPU 16 returns to Step S13 of the flowchart of FIG. 6.

On the other hand, if the judgment in Step S45 is YES, the CPU 16 proceeds to Step S47 to further make a judgment as to whether or not the total frame number TF(j) of the present theme block J is equal to or greater than five. If the total frame number TF(J) of the present theme block J is equal to or greater than five, the CPU 16 carries out the designation of sequential sections consisting of the introductory section whose total frame number is T1, the intermediary section whose total frame number is T2, and the terminatory section whose total frame number is T3, in Step S49. The total frame number TF(J) of the theme block J is used as a parameter in determining the values T1, T2, and T3 with reference to the section name reference table 164.

For example, in the case where the theme block J includes five frames (K=J1, J2, J3, J4, and J5) as shown in FIG. 22B, this theme block J is divided into three, i.e., introductory, intermediary, and terminatory, sections according to the section name reference table 164. A first frame (K=J1) is designated as the introductory section, succeeding three frames (K=J2, J3, and J4) are designated as the intermediary section, and a final frame (K=J5) is designated as the terminatory section. In other words, T1, T2, and T3 are valued to 1, 3, and 1, respectively, in this case.

FIG. 22A illustrates frames (K=1, 2, 3, . . . , J1–J5, . . . FN) aligned along a longitudinal direction of the film F. For example, as shown in FIG. 22B, first three frames (K=1, 2, 3) constitute one theme block 1 and, in a middle, the five frames (K=J1–J5) constitutes another theme block J. The CPU 16 designates section names with respect to each of these theme blocks and stores them in the memory equipped therein. FIG. 22C shows the content of memory storing these section names having been designated, in which the frames (K=1–3, . . . , J1–J5) are respectively named in the above-described way in connection with appropriate addresses such as 010, 100, 101, and 102. The value of BK(K) in this memory denotes attributions representing respective sections, which are designated in accordance with the following procedure.

Namely, in Step S51, a count value I specifying a frame number in each section is set to "1[ The CPU 16 proceeds to Step S53 to make a judgment as to whether or not the count value I is equal to or less than the value T1. When the value I is equal to or less than T1, the attribution BK (K) is set to "1" in Step S55. The value "1" of the attribution BK(K) denotes the introductory section. Thereafter, the count value I and the frame number K are respectively incremented in Step S57. The CPU 16 returns to Step S53 and repeats the same procedure of Steps S53–S57 until the count value I exceeds T1. Through the repetition of this procedure all the frames assigned to the introductory section is given a value "1" in the attribution BK(K).

If the count value I exceeds T1 in Step S53, the CPU 16 proceeds to Step S59 to set the count value I to "1" again. Then the CPU 16 proceeds to Step S61 to make a judgment as to whether or not the count value I is equal to or less than the value T2. When the value I is equal to or less than T2, the attribution BK(K) is set to "2" in Step S63. The value "2" of the attribution BK(K) denotes the intermediary section. Thereafter, the count value I and the frame number K are respectively incremented in Step S65. Then, the CPU 16 returns to Step S61 and repeats the same procedure of Steps S61–S65 until the count value I exceeds T2. Through the repetition of this procedure all the frames assigned to the intermediary section is given a value "2" in the attribution BK(K).

If the count value I exceeds T2 in Step S61, the CPU 16 proceeds to Step S67 to set the count value I to "1" again. Then the CPU 16 proceeds to Step S69 to make a judgment as to whether or not the count value I is equal to or less than the value T3. When the value I is equal to or less than T3, the attribution BK(K) is set to "3" in Step S71. The value "3" of the attribution BK(K) denotes the terminatory section. Thereafter, the count value I and the frame number K are respectively incremented in Step S73. The CPU 16 returns to Step S69 and repeats the same procedure of Steps S69–S73 until the count value I exceeds T3. Through the repetition of this procedure, all the frames assigned to the terminatory section is given a value "3" in the attribution BK(K).

If the count value I exceeds T3 in Step S69, it means that all the procedure necessary for naming the theme block J is over. Accordingly, the count value J is incremented in Step S83 and the CPU 16 returns to Step S45. Thereafter, the above-described procedure is newly executed with respect to the next theme block J+1.

Step S47 is provided to discriminate if the theme block is a single, i.e., supplementary, section or not. If the total frame number TF(J) is less than five in Step S47, the CPU 16 concludes that the present theme block is a supplementary section and proceeds to Step S75. For example, the theme block 1 of FIG. 22B consists of only three frames (K=1-3) and therefore, is identified as a single, i.e., a supplementary section. In Step S75, the CPU 16 sets the count value I to "1". Next, in Step S77, the CPU 16 makes a judgment as to whether or not the count value I is equal to or less than the total frame number TF(J). If the count value I is equal to or less than the total frame number TF(J), the CPU 16 goes on to Step S79 to set the attribution BK(K) to 0. The value "0" of the attribution BK(K) denotes the supplementary section.

Thereafter, the count value I and the frame number K are respectively incremented in Step S81. The CPU 16 returns to Step S77 and repeats the same procedure of Steps S77–S81 until the count value I exceeds TF(J). Through the repetition of this procedure all the frames assigned to the supplementary section is given a value "0" in the attribution BK(K). If the count value I exceeds TF(J) in Step S77, it means that all the procedure necessary for naming the theme block J is over. Accordingly, the count value J is incremented in Step S83 and the CPU 16 returns to Step S45. When all the procedure defined by the flowchart of FIG. 7 is finished, the CPU 16 returns to Step S13 of the main flowchart of FIG. 6.

In this way, respective frames of each theme block are given the attribution corresponding to any one of the introductory, intermediary, terminatory, and supplementary section As described above, these attributions are stored in the memory of the CPU 16. It is, however, possible to magnetically record these attributions on the marginal portion FM of the corresponding frames of the film F instead of using the memory in the CPU 16.

Figure 8:
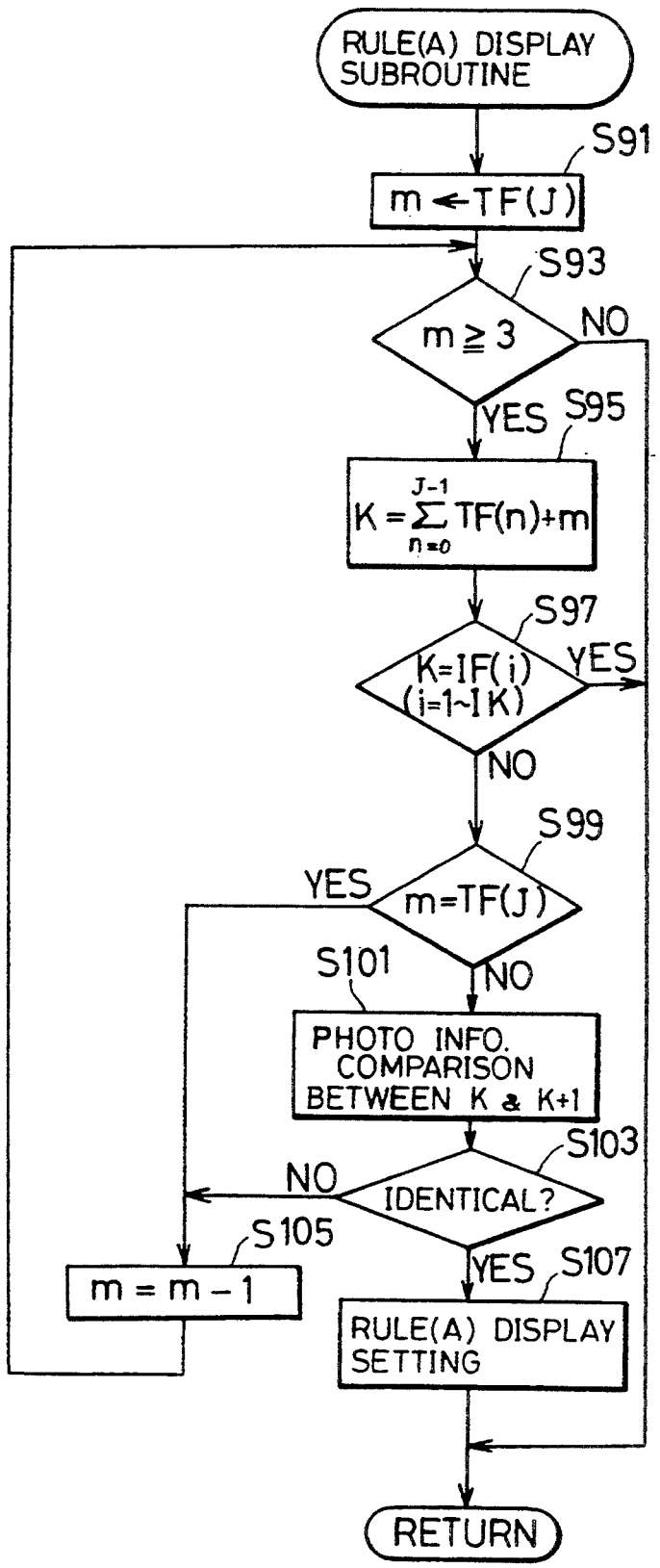
FIG. 8 is a flowchart showing a "RULE (A) DISPLAY" subroutine.

Now referring to a flowchart of FIG. 8, the "RULE (A) DISPLAY" subroutine of Step S21 will be explained. The "RULE (A) DISPLAY" subroutine is characterized in that the display presentation is differentiated if consecutive several frames have the same or common photographic information.

First, in Step S91, a variable m is set to TF(J), a total frame number of the present theme block. Next, in Step S93, the CPU 16 makes a judgment as to whether or not the variable m is equal to or larger than "3". If the variable m is equal to or larger than "3", a frame number K to be adopted a presentation way determined in the following EQUATION (1) in Step S95.

$$K = \sum_{n=0}^{J-1} TF(n) + m \quad (1)$$

As a result of the calculation defined by the EQUATION (1), the last frame of the present theme block J is specified in Step S95.

Subsequently, the CPU 16 proceeds to Step S97 to make a judgment as to whether or not the specified frame number K is identical with the first frame numbers IF(i) of respective image blocks, where i=1, 2, . . . IK. If the specified frame number K is identical with the first frame numbers IF(i) of respective image blocks, the CPU 16 skips this "RULE (A) DISPLAY" subroutine and immediately returns to Step S23 of FIG. 6. This is because the first frames of respective image blocks are applied with the "RULE (B) DISPLAY" presentation way, which will be described later, instead of the "RULE (A) DISPLAY" presentation.

If the judgment in Step S97 is NO, the CPU 16 proceeds to Step S99 to make a judgment as to whether or not the variable m is identical with TF(J). As the variable m is equal to TF(j) in this moment, the judgment in Step S99 becomes YES. The CPU 16 proceeds to Step S105 to decrement the variable m and returns to Step S93. If the variable m is still equal to or larger than "3" in Step S93, a new frame number K, i.e., a second frame from the last in the present theme block J, is specified in Step S95 according to the EQUATION (1). Next, the CPU 16 proceeds to Step S101 through Step S99 because the variable m is smaller than TF(J) in this instance.

In Step S101, the CPU 16 compares the set photographic information between the present and previous frames K, K+1. For example, the predetermined photographic information would be a camera position (vertical or horizontal), a format, and a magnifying power. Then, the CPU16 proceeds to Step S103 to make a judgment whether or not any one of predetermined photographic information is identical between two frames K and K+1. If the judgment in Step S103 is NO, the CPU 16 goes on to Step S105.

On the contrary, if the judgment in Step S103 is YES. The CPU 16 proceeds to Step S107 to execute the "RULE (A) DISPLAY" presentation. The "RULE (A) DISPLAY" presentation changes the method of displaying images between the frames K and K+i in at least one of an appearing pattern PI(K), a display speed P2(K), a kind of motion P3(K), a disappearing pattern P4(K), a disappearing speed PS(K), a dark change time P6(K), and a magnifying power P7(K).

FIGS. 18A–18F show one example of the "RULE (A) DISPLAY" presentation way. Let us suppose that the photo graphed images of frame numbers K and K+1 are identical with each other in the camera position being vertical. As shown in FIG. 18A, an image K0 of the frame number K appears from the right edge on the screen 3 of the monitor TV 2. This image K0 continuously moves in the same direction at a predetermined speed until it reaches the left edge, as shown in FIGS. 18B and 18C. In turn, an image K1 of the frame number K+1 appears from the left edge on the screen 3 as shown in FIG. 18D. This image K1 continuously moves in an opposite direction at a predetermined speed until it reaches the right edge, as shown in FIGS. 18E and 18F. Thereafter, both the images K0 and K1 are faded out simultaneously. As apparent from the drawings, a lateral width of each image (K0 or K1) is a half of the screen 3.

Figure 6:
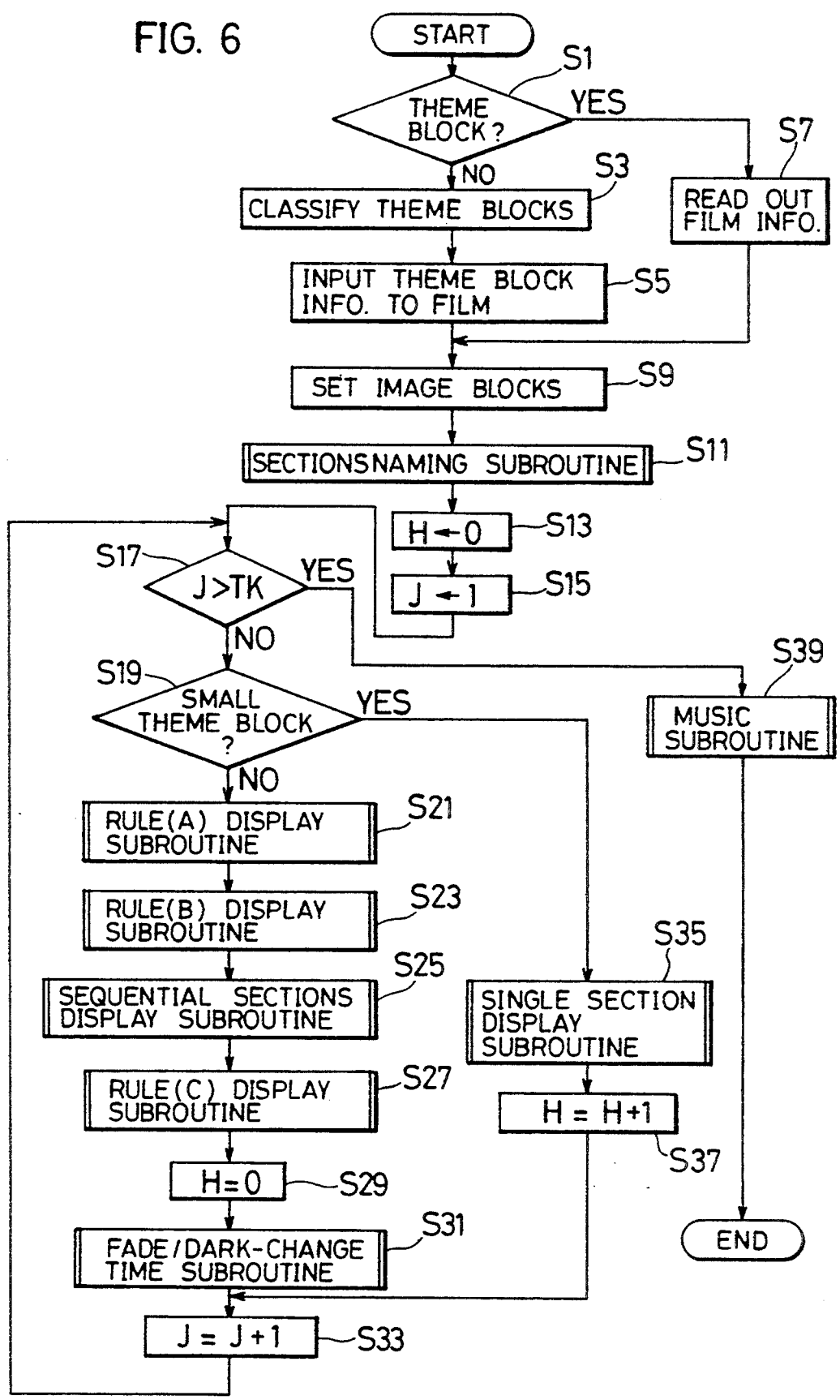
FIG. 6 is a flowchart showing a main routine for setting a presentation way.
Figure 7:
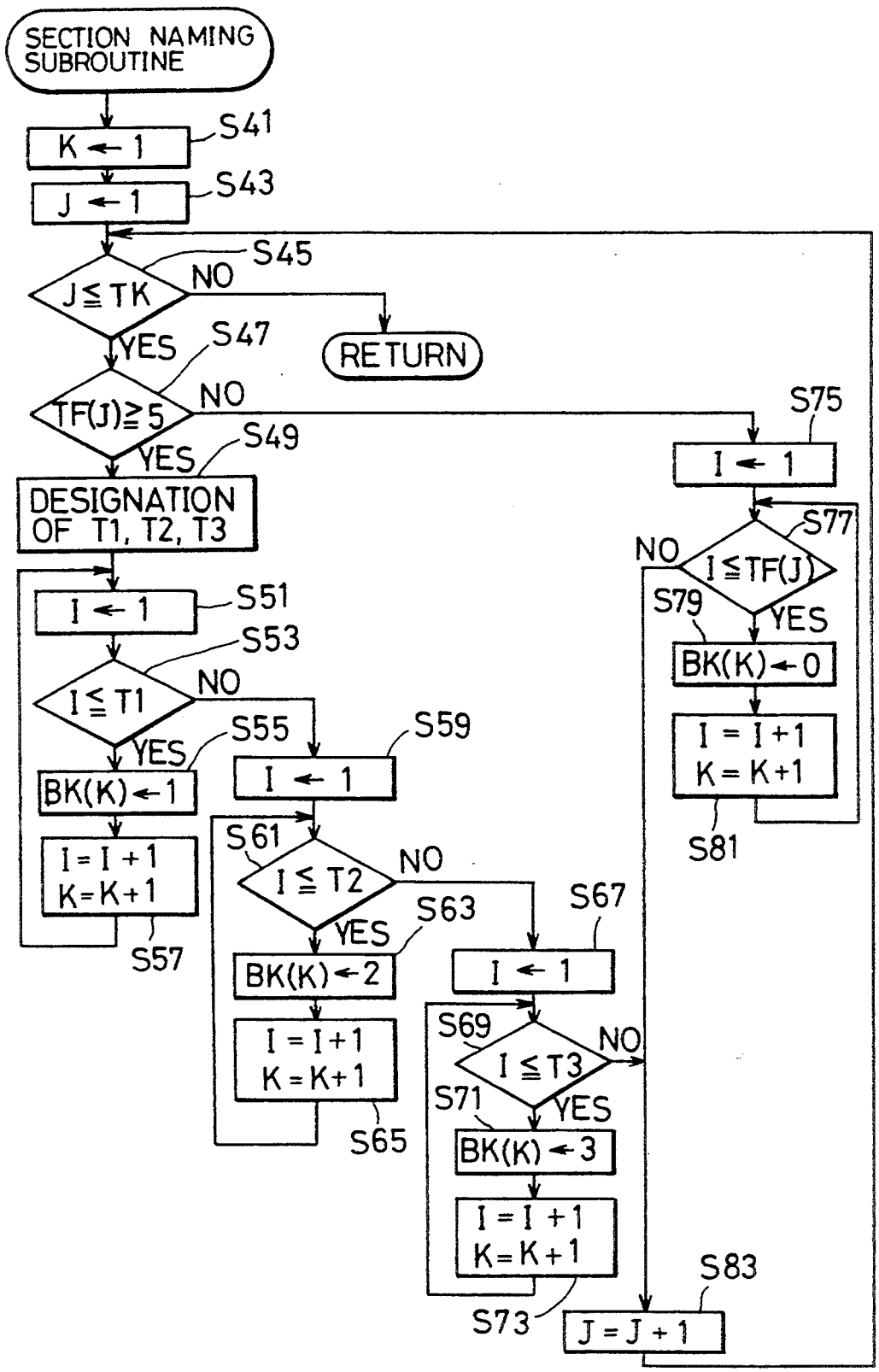
FIG. 7 is a flowchart showing a "SECTION NAMING" subroutine.

Returning to Step S93, if the variable m becomes less than "3", the CPU 16 ends this subroutine and returns to Step S23 of FIG. 6. This prevents first two frames of each theme block from being applied with the "RULE (A) DISPLAY" presentation.

Figure 9:
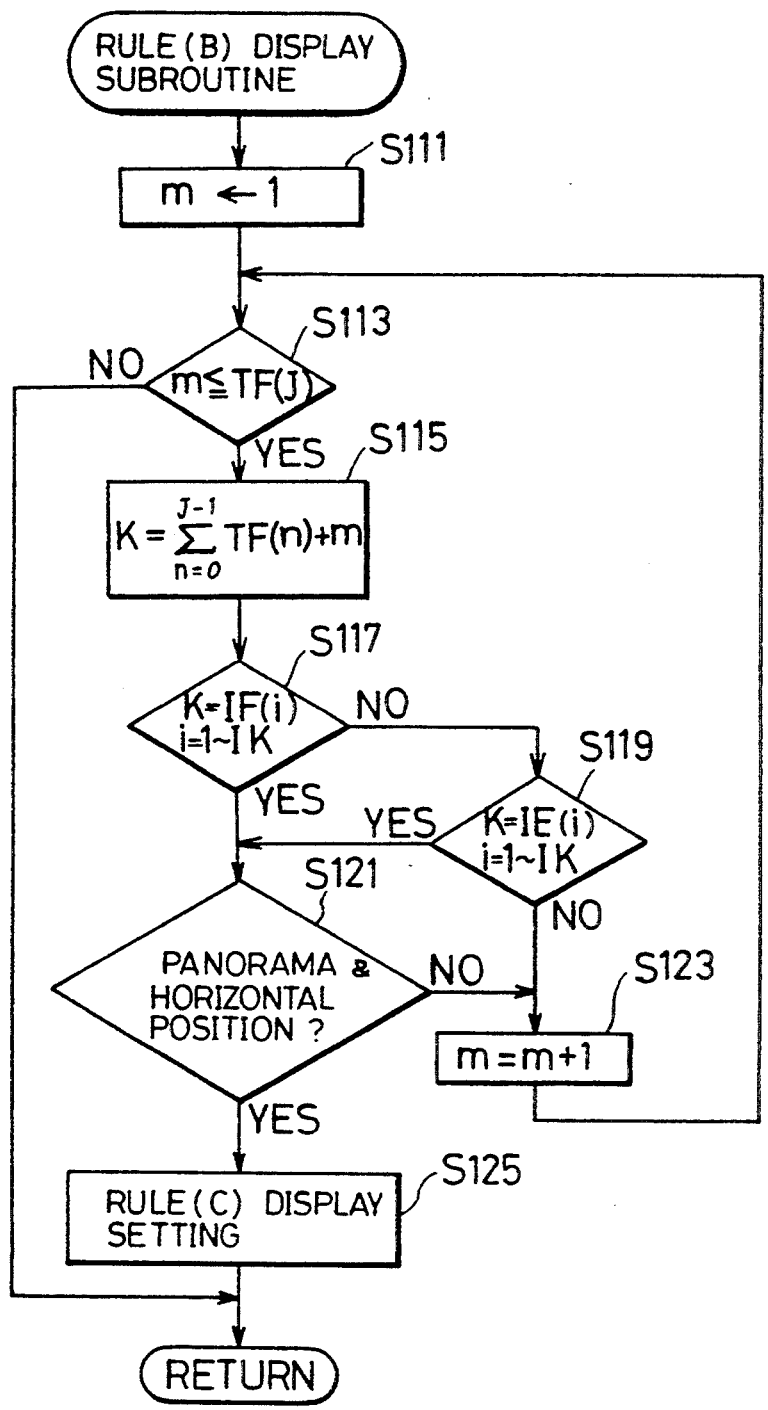
FIG. 9 is a flowchart showing a "RULE (B) DISPLAY" subroutine.

The "RULE (B) DISPLAY" subroutine of Step S23 will be explained in detail with reference to a flowchart of FIG. 9. The "RULE (B) DISPLAY" subroutine is characterized in that the presentation way is differentiated if first or last frame of the image block has a predetermined photographic information (e.g., panorama & horizontal camera position .in this embodiment).

In Step S111, the variable m is set to "1". Next, in Step S113, the CPU 16 makes a judgment as to whether or not the variable m is equal to or less than TF(J), the total frame number of the present theme block J. If the variable m is equal to or less than "TF(J)", a frame number K to be adopted a presentation way is determined in accordance with EQUATION (1) in Step S115.

Subsequently, the CPU 16 proceeds to Step S117 to make a judgment as to whether or not the specified frame number K is identical with the first frame numbers IF(i) of respective image blocks, where i=1, 2, . . . IK. If the specified frame number K is not identical with the first frame numbers IF(i), the CPU 16 proceeds to Step S119 to further make a judgment as to whether or not the specified frame number K is identical with the last frame numbers IE(i) of respective image blocks, where i:1, 2, . . . IK. If the specified frame number K is not identical with the last frame numbers IE(i), the CPU 16 proceeds to Step S123 to increment the variable m and returns to Step S113.

On the contrary, if the specified frame number K is identical with the first frame numbers IF(i) or the last frame number IE(i) in Steps S117 and S119, the CPU 16 proceeds to Step S121 to make a judgment as to whether or not the photographic information of the specified frame number K includes panorama & horizontal camera position. If the judgment in Step S121 is NO, the CPU 16 proceeds to Step S123.

If the photographic information of the specified frame number K includes panorama & horizontal camera position, the CPU 16 proceeds to Step S125 to execute the "RULE (B) DISPLAY" presentation. The "RULE (B) DISPLAY" presentation way changes the method of displaying the image of the frame number K by changing at least one of the appearing pattern P1(K), display speed P2(K), and magnifying power P7(K).

Figures 19A, 19B, 19C:
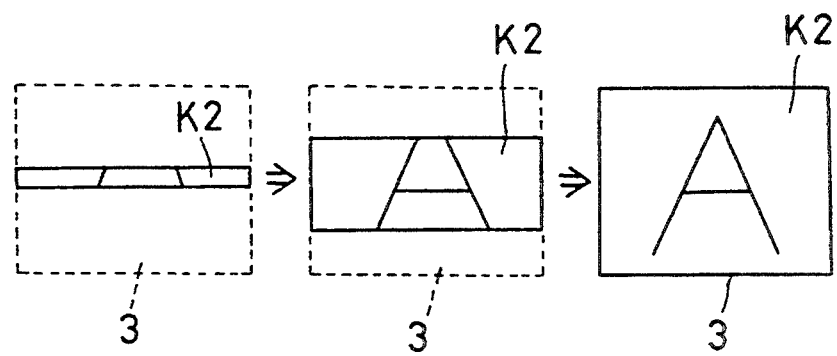
FIGS. 19A–19C are diagrams illustrating one example of the rule (B) display presentation.

FIGS. 19A–19C show one example of the "RULE (B) DISPLAY" presentation way. As shown in FIG. 19A, an image K2 of the frame number K appears as a horizontally extending thin zone at a center of the screen 3. This image K2 continuously extends its display zone in both up and down directions at a predetermined speed until it reaches the uppermost and lowermost edges, as shown in FIGS. 19B and 19C. Thereafter, the CPU 16 ends this subroutine and returns to Step S25 of FIG. 6.

Accordingly, this "RULE (B) DISPLAY" presentation way prevents the presentation way from becoming monotonous in the reproduction of the panoramic photographed images. As the "RULE (B) DISPLAY" presentation way is applied to the first or last frame of each image block, this brings another advantage in that the beginning or ending of each image block can be clearly recognized.

It is needless to say that "panorama & horizontal camera position", the factor of determining the "RULE (B) DISPLAY" presentation can be replaced by others. The content of the "RULE (B)DISPLAY" presentation way can be also modified. For example, the last frame in each image block can be zoomed down, while the first frame stays stationarily without zooming effect. Still further, the dark change times of the first and last frames can be extended to be longer than those of others, the method of which will be explained later.

The "SEQUENTIAL SECTION DISPLAY" subroutine of Step S25 will be explained in detail with reference to a flowchart of FIGS. 10 and 11. The "SEQUENTIAL SECTION DISPLAY" subroutine is performed for presentation of the introductory, intermediary, and terminatory sections designated in the "SECTION NAMING" subroutine of Step S11.

In Step S131, a reference value B is set to "1". The variable m is also set to "1" in Step S133. A frame number K to be adopted a presentation way is determined in accordance with EQUATION (1) in Step S135. Subsequently, the CPU 16 proceeds to Step S137 to make a judgment as to whether or not the attribution BK(K) of the specified frame number K is identical with the reference value B(=1). If the attributution BK (K) is set to "1", the CPU 16 proceeds to Step S13.9 to execute a presentation way for the introductory section. In order to set the display presentation for the introductory section, the CPU 16 determines the appearing pattern P1(K), display speed P2(K), kind of motion P3(K), disappearing pattern P4(K), disappearing speed P5(K), and dark change time P6(K) with reference to the presentation reference table 166. Subsequently, the variable m is incremented in Step S141 and the CPU 16 returns to Step S135 to successively determine the presentation way for the introductory section.

The following tables 1 and 2 show one example of the presentation way for the introductory section. Above factors Pl(K)–P6(K) are determined by taking account of TABLEs 1 and 2.

TABLE 1

| | Total Number of Frames | | | | | |
|---|---|---|---|---|---|---|
| | 2 | 3 | 4 | 5 | 6 | 7 |
| 1 | A | A | A | A | A | A |
| 2 | A | A | A | A | A | A |
| 3 | | A | A | A | A | A |
| 4 | | | A | A | A | B(C) |
| 5 | | | | B(C) | B(C) | A |
| 6 | | | | | B(C) | A |
| 7 | | | | | | B(C) |

TABLE 2

| | Nor. & Hor. | Nor. & Ver. | Pano. & Hor. | Pano. & Ver. |
|---|---|---|---|---|
| A | Fade In | Fade In | Fade In | Fade In/Tilt |
| | 5 sec Pause | 5 sec Pause | 5 sec Pause | |
| | Fade Out | Fade Out | Fade Out | Fade Out/Tilt |
| B | Fade In | Fade In | Fade In | Fade In/Tilt |
| | 3 sec Pause | 3 sec Pause | 3 sec Pause | |
| | Zoom Up | Zoom Up | Zoom Up | Fade Out/Tilt |
| | 1.5 sec Pause | 1.5 sec Pause | 1.5 sec Pause | |
| | Fade Out | Fade Out | Fade Out | |
| C | Fade In | Fade In | Fade In | |
| | 1.5 sec Pause | 1.5 sec Pause | 1.5 sec Pause | |
| | Zoom down | Zoom down | Zoom down | |
| | 3 sec Pause | 3 sec Pause | 3 sec Pause | |
| | Fade Out | Fade Out | Fade Out | |

TABLE 1 provides six different combinations of display patterns A, B, and C. TABLE 2 shows detailed contents of respective display patterns A, B, and C. "Nor.", "Pano.", "Hor.", and "Ver." in TABLE 2 stand for "Normal", "Panorama", "Horizontal", and "Vertical", respectively. Also, the meaning of "Fade In/Tilt" is to fade in while tilting up from the bottom of the screen and the meaning of "Fade Out/Tilt" is to fade out while tilting up toward the top of the screen.

Let us now suppose that the total number of frames is five. In this case, first four frames are applied the display presentation of pattern A and last one frame is applied the presentation way of B(C). It is further supposed that an image of the first frame is taken by the normal setting with horizontal camera position and an image of the last frame is, on the contrary, taken by the panorama setting with horizontal camera position.

In accordance with the content of the pattern A of TABLE 2, the image of the first frame fades in first of all on the screen 3 of the monitor TV 2. The image of the first frame pauses five seconds and subsequently fades out. On the other hand, the image of the last frame fades in first of all on the screen and pauses three seconds. After that, the image is zoomed up and pauses one and half seconds. The image fades out.

When consecutive two frames are taken by the same condition, e.g., any one of the normal & horizontal, normal & vertical, panorama & horizontal, and panorama & vertical, the display positions of these two frames are switched on the screen by overlapping or intersecting with each other.

Moreover, if the pattern B is applied to the first frame of the consecutive two frames, the pattern C is applied to the last frame.

Figure 10:
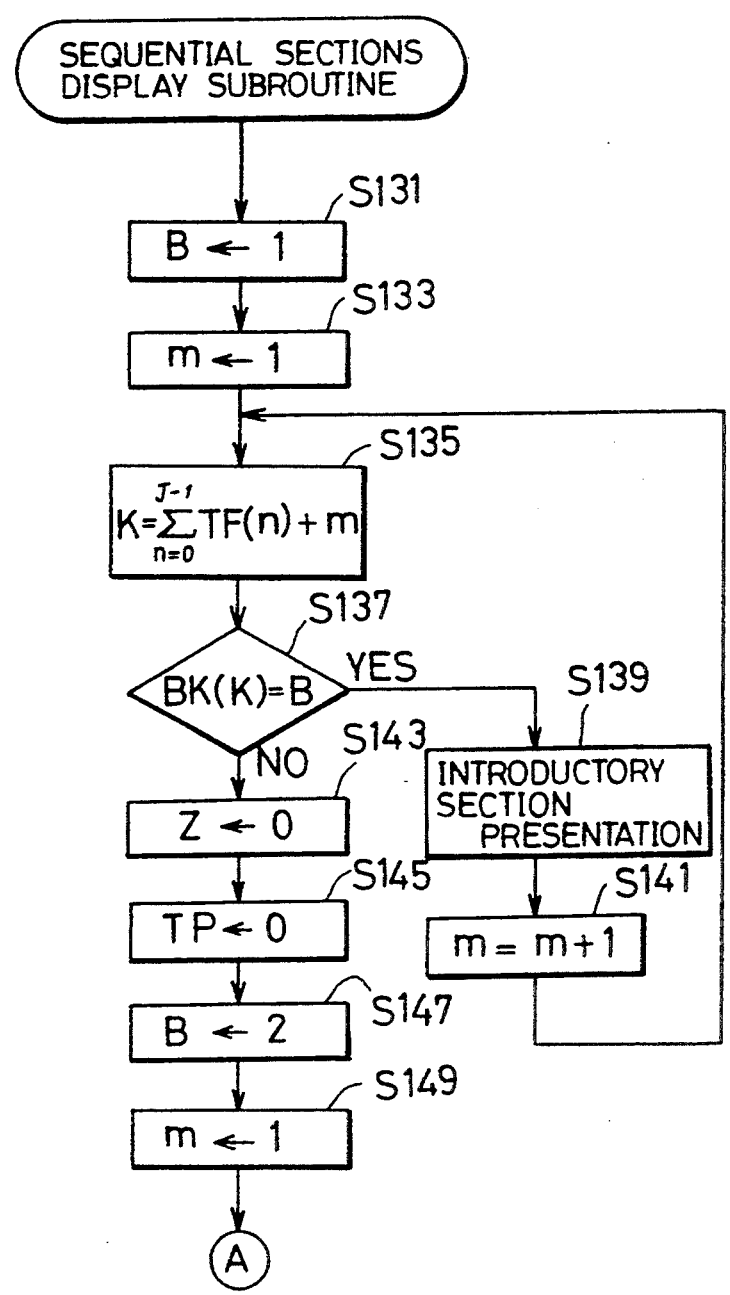
FIGS. 10 and 11 show a flowchart of a "SEQUENTIAL SECTIONS DISPLAY" subroutine.

Returning to the flowchart of FIG. 10, the CPU 16 returns Step S135 after incrementing the variable m in Step S141. If the attribution BK(K) of the specified frame number K is set to "2" in Step S137, the CPU 16 proceeds to Step S143 to set a count value Z to "0". This count value Z denotes how many times a zoom presentation is set. Furthermore, the CPU 16 proceeds to Step S145 to set a count value TP to "0" This count value TP denotes how many times a panning or tilting presentation is set. The "panning" generally refers to such motion as a movie camera or TV camera being moved horizontally to secure a panoramic effect. On the other hand, the "tilting" generally refers to such motion as a movie camera or TV camera being moved vertically from bottom to top or vice versa.

The CPU 16 proceeds to Step S147 to set the above-described reference value B to "2" and, thereafter, proceeds to Step S149 to set the variable m to "1". The frame number K to be adopted a presentation way is determined in accordance with EQUATION (1) in Step S151. Subsequently, the CPU 16 proceeds to Step S153 to make a judgment as to whether or not the attribution BK(K) of the specified frame number K is identical with the reference value B(=2). Namely, it is discriminated in Step S153 if the specified frame number belongs to the intermediary section.

If the attribution BK(K) is set to "2", the CPU 16 proceeds to Step S155 to pick up the photographic information relating to the frame number K. The photographic information includes camera position (horizontal or Vertical), format, magnifying power $\beta$, focal distance, etc. order to set a presentation way for the intermediary section, the CPU 16 determines the appearing pattern P1(K), display speed P2(K), kind of motion P3(K), disappearing pattern P4(K), disappearing speed P5(K), and dark change time P6 (K) with reference to the presentation reference table 166 on the basis of the photographic information.

TABLE 3 shows one example of the display presentation for the intermediary-section. Above factors Pi(K)-P6(K) are determined by taking account of TABLE 3.

TABLE 3

| Photo Condition | Intermediary Presentation |
|---|---|
| Normal & Horizontal<br>Infinite distance<br>$1/200 > \beta, \beta > 1/120$ | Fade In → Pause → Fade Out<br>(3 sec) |
| Normal & Horizontal<br>$1/200 \leq \beta \leq 1/120$ | Fade In → Pause → Zoom Up → Pause → Fade Out<br>(3 sec) (1.5 sec) |
| Normal & Vertical<br>Infini.dis. $\beta \leq 1/200$ | Fade In → Pause → Zoom Dn → Pause → Fade Out<br>(1.5 sec) (3 sec) |
| Normal & Vertical<br>$\beta > 1/80$ | (Main Screen)<br>Fade In → Pause → Zoom Dn → Pause → Fade Out<br>(2 sec) (7.5 sec)<br>(Sub Screen)<br>Pause → Tilt Dn → Fade Out<br>(9.5 sec) (6 sec) |
| Normal & Vertical<br>$1/200 < \beta \leq 1/80$ | (Main Screen)<br>Fade In → Pause → Zoom Dn → Pause → Fade Out<br>(2 sec) (7.5 sec)<br>(Sub Screen) |

TABLE 3-continued

| Photo Condition | Intermediary Presentation |
| --- | --- |
| | Pause → Tilt Up → Fade Out |
| | (9.5 sec)  (6 sec) |
| Panorama & Horizontal Infinite distance | Fade In → Panning → Fade Out |
| Panorama & Horizontal Finite distance | Fade In → Pause → Zoom Dn → Pause → Fade Out |
| | (1.5 sec)  (3 sec) |
| Panorama & Vertical | Fade In → Tilt Up → Fade Out |

Let us now suppose that an image is taken by the normal setting with horizontal camera position at an infinite distance and a magnifying power of $1/200 > \beta$, $\beta > 1/120$. In this case, the image fades in first of all, pauses three seconds after that and fades out finally.

Furthermore let us suppose that an image is taken by the panorama setting with horizontal camera position at an infinite distance. In this case the image fades in first of all, pans after that, and fades out finally.

The main screen in the TABLE 3 denotes the screen 3, while the sub-screen is a reduced-size screen compared or sectioned as a part of the screen 3.

Figure 11:
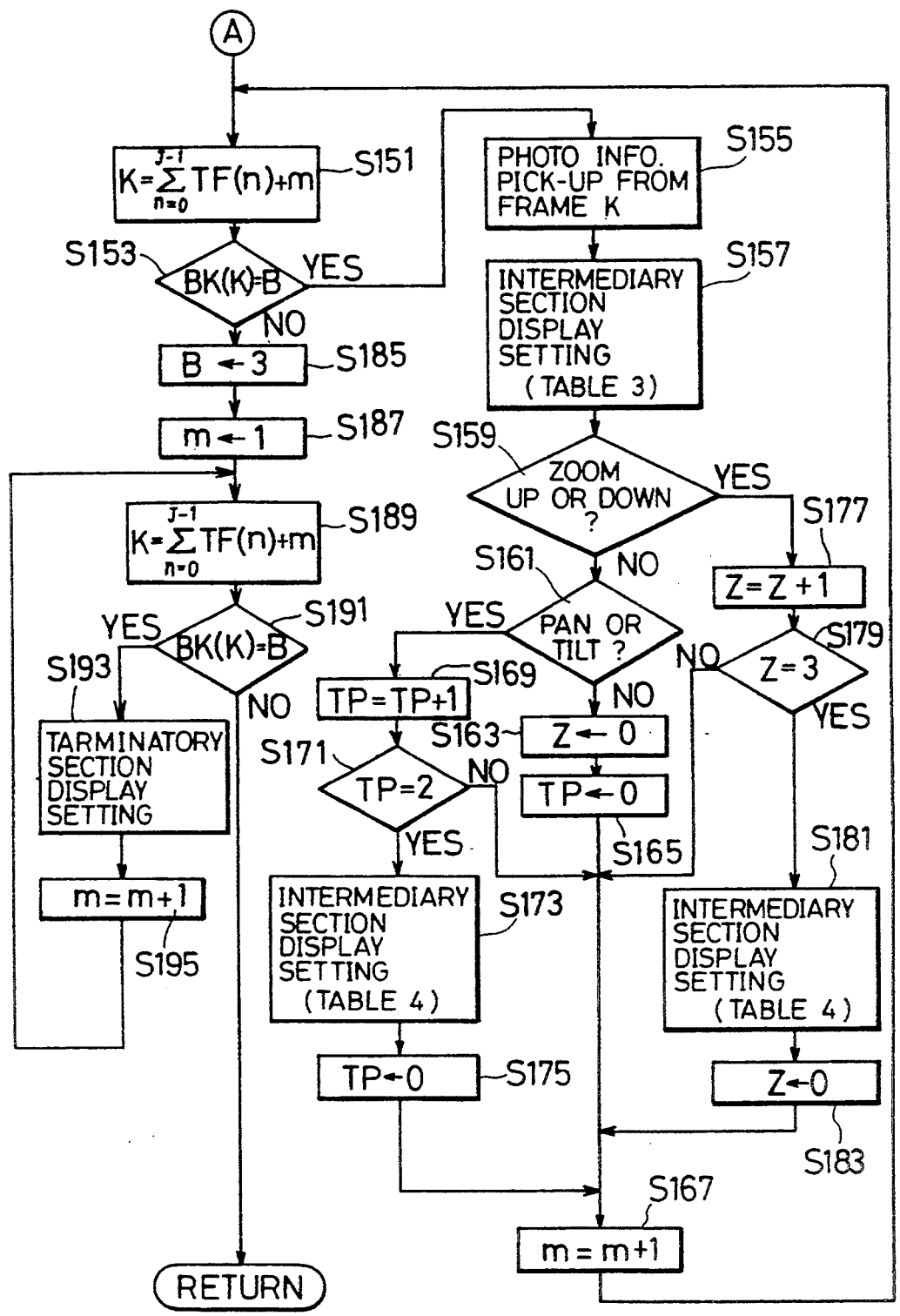

Now returning to the flowchart of FIG. 11, the CPU 16 proceeds to Step S159 to make a judgment as to whether or not the kind of motion P3(K) includes a zoom up or a zoom down motion. If the judgment in Step S159 is NO, the CPU 16 proceeds to Step 161 to further make a judgment as to whether or not the kind of motion P3(K) includes a panning or tilting motion. If the judgment in Step S161 is NO, the CPU 16 proceeds to Steps S163 and S165 to reset the count values Z and TP to "0". The variable m is incremented in Step S167 and the CPU 16 returns to Step S151.

If the zoom up or down motion is included in Step S159, the CPU 16 proceeds to Step S177 to increment the count value Z. Subsequently, the CPU 16 proceeds to Step S179 to make a judgment as to whether or not the count value Z is identical with "3". By this judgment, it is found if the zoom up or down motion is consecutively carried out three times in the present theme block. If the judgment in Step S179 is NO, the CPU 16 proceeds to Step S167. On the other hand, if the zoom up down motion is consecutively carried out three times, the CPU 16 proceeds to Step S181 to execute a presentation way for the intermediary section with reference to TABLE 4 stored in the presentation reference table 166.

P5(K), and dark change time P6 (K), so as to prevent consecutive frames from being applied the same presentation.

For example, in the case where an image is taken by the panorama setting with infinite distance, the image fades in first of all, pauses one and half seconds after that zooms down subsequently, pauses three seconds thereafter, and fades out finally.

Next, in Step S183, the count value Z is reset to "0" and the CPU 16 goes on to Step S167. Meanwhile, if the panning or tilting motion is included in Step S161, the CPU 16 proceeds to Step S169 to increment the count value TP. Subsequently, the CPU 16 proceeds to Step S171 to make a judgment as to whether or not the count value TP is identical with "2". By this judgment, it is found if the panning or tilting motion is consecutively carried out two times in the present theme block. If the judgment in Step S171 is NO, the CPU proceeds to Step S167. On the other hand, if the panning or tilting motion is consecutively carried out two times, the CPU 16 proceeds to Step S173 to execute a presentation way for the intermediary section with reference to TABLE 4. Thereafter, in Step S175, the count value TP is reset to "0" and the CPU 16 proceeds to Step S167.

Returning to Step S153, if all the presentation with respect to the intermediary section is over, the judgment Step S153 turns to NO. Next, the reference value B is set to "3" in Step S185 and the variable m is set to "1" in Step S187. Subsequently, the frame number K to be adopted a presentation way determined in accordance with EQUATION (1) in Step S189. The CPU 16 proceeds to Step S191 to make a judgment as to whether or not the attribution BK(K) of the specified frame number K is identical with the reference value B(=3). If the attribution BK(K) is set to "3", the CPU 16 proceeds to Step S193 to execute a presentation way for the terminatory section. Namely, it is discriminated

TABLE 4

| Photo Condition | Intermediary Presentation |
| --- | --- |
| Normal & Horizontal Infinite distance $1/200 > \beta, \beta > 1/120$ | Fade In → Pause → Fade Out (3 sec) |
| Normal & Horizontal $1/200 \leq \beta\ 1/120$ | Fade In → Pause → Fade Out (5 sec) |
| Normal & Vertical Infini.dis. $\beta \leq 1/200$ | Fade In → Tilt Up → Fade Out |
| Normal & Vertical $\beta > 1/80$ | Fade In → Pause → Zoom Dn → Pause → Fade Out (1.5 sec)  (3 sec) |
| Normal & Vertical $1/200 < \beta \leq 1/80$ | Fade In → Pause → Fade Out (5 sec) |
| Panorama & Horizontal Infinite distance | Fade In → Pause → Zoom Dn → Pause → Fade Out (1.5 sec)  (3 sec) |
| Panorama & Horizontal Finite distance | Fade In → Pause → Zoom Dn → Pause → Fade Out (1.5 sec)  (3 sec) |
| Panorama & Vertical | Fade In → Tilt Up → Fade Out |

TABLE 4 is similar to TABLE 3 but is differentiated from it as much as possible with respect to the appearing pattern P1(K), display speed P2(K), kind of motion P3(K), disappearing pattern P4(K), disappearing speed in Step S191 if the specified frame number K belongs to the terminatory section.

In order to set the presentation way for the terminatory section, the CPU 16 determines the appearing pattern P1(K), display speed P2(K), kind of motion P3(K), disappearing pattern P4(K), disappearing speed P5(K), and dark change time P6(K) with reference to the presentation reference table 166.

TABLEs 5 and 6 show one example of the presentation way for the terminatory section.

TABLE 5

| | Total Number of Frames | | | | | | |
|---|---|---|---|---|---|---|---|
| | 1 | 2 | 3 | 4 | 5 | 6 | 7 |
| 1 | C | A | A | A | A | A | A |
| 2 | | C | B | A | A | A | A |
| 3 | | | C | B | B | A | A |
| 4 | | | | C | B | B | B |
| 5 | | | | | C | B | B |
| 6 | | | | | | C | C |
| 7 | | | | | | | C |

TABLE 6

| | Nor. & Hor. | Nor. & Ver. | Pano. & Hor. | Pano. & Ver. |
|---|---|---|---|---|
| A | Fade In<br>6.5 sec Pause<br>Fade Out | Fade In/Tilt<br>Fade Out/Tilt | Fade In/Pan<br>Fade Out/Pan | Fade In/Tilt<br>Fade Out/Tilt |
| B | Fade In<br>3 sec Pause<br>Zoom Down<br>4 sec Pause<br>Fade Out | Fade In<br>3 sec Pause<br>Zoom Down<br>4 sec Pause<br>Fade Out | Fade In<br>3 sec Pause<br>Zoom Down<br>4 sec Pause<br>Fade Out | Fade Out/Tilt |
| C | Fade In<br>6.5 sec Pause<br>Fade Out/<br>Zoom Down | Fade In<br>6.5 sec Pause<br>Fade Out/<br>Zoom Down | Fade In<br>6.5 sec Pause<br>Fade Out/<br>Zoom Down | Fade In/Zoom Down<br>Fade Out |

TABLE 5 provides seven different combinations of display patterns A, B. and C. TABLE 6 shows detailed contents of respective display patterns A, B, and C. "Nor.". "Pano.", "Hor.", and "Ver." in TABLE 6 stand for "Normal" "Panorama", "Horizontal", and "Vertical", respectively. Also, the meaning of "Fade In/Tilt" is to fade in while tilting up from the bottom of the screen, and the meaning of "Fade Out/Tilt" is to fade out while tilting up toward the top of the screen. Furthermore, the meaning of "Fade In/Zoom Down" is to fade in while zooming down, and the meaning of "Fade Out/Zoom Down" is to fade out while zooming down. Still further, the meaning of "Fade In/Pan" is to face in while panning from left edge of the screen and "Fade Out/Pan" is to fade out while panning toward the right edge of the screen.

Let us now suppose that the total number of frames is one and an image is taken by the panorama setting with horizontal camera position. In this case, the image fades in initially, pause 6.5 sec, and fades out while zooming down.

Next, the variable m is incremented in Step S195 and the CPU 16 returns to Step S189. On the other hand, if the BK(K) is not identical with B(=3) in Step S191, the CPU 16 ends this subroutine and returns to Step S27 of FIG. 6.

In this way, each of the introductory, intermediary, and terminatory sections is independently determined its presentation way, so at to prevent the similar presentation from continuing several times.

The "RULE (C) DISPLAY" subroutine of Step S27 will be explained in detail with reference to a flowchart of FIG. 12. The "RULE (C) DISPLAY" subroutine is characterized in that the presentation way is differentiated if the same display presentation (e.g., zooming up in this embodiment) is repeated.

First, in Step S201, a count value Zup is reset to "0". This count value Zup denotes how many times the zooming up presentation is used. Similarly, in Step S203, the variable m is set to "1". Next, in Step S205, the CPU 16 makes a judgment as to whether or not the variable m is equal to or less than TF(J), the total frame number of the present theme block J. If the variable m is equal to or less than "TF (J)", a frame number K to be adopted a display presentation is determined in accordance with EQUATION (1) in Step S207.

Subsequently, the CPU 16 proceeds to Step S209 to make a judgment as to whether or not the kind of motion P3(k) includes the zooming up motion. If P3(K) includes the zooming up motion, the CPU 16 proceeds to Step S211 to increment the count value Zup. In turn, the CPU 16 proceeds to Step S213 to make a judgment as to whether or not the zooming up motion is used three times. For this judgment, the count value Zup is first of all divided by 3 to obtain the remainder. If this remainder is "2", the CPU 16 concludes that the zooming up motion is used three times.

If the judgment of Step S213 is YES, the CPU 16 proceeds to Step S215 to execute the "RULE (C) DISPLAY" presentation. The "RULE (C) DISPLAY" presentation way changes the method of displaying the image of the frame number K by changing at least one of the appearing pattern Pi(K), display speed P2(K), and magnifying power P7(K).

Figures 20A, 20B, 20C:
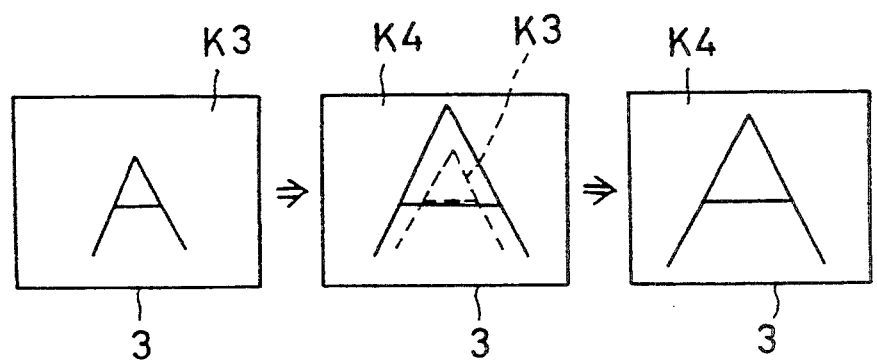
FIGS. 20A–20C are diagrams illustrating one example of the rule (C) display presentation.

FIGS. 20A-20C shows one example of the "RULE (C) DISPLAY" presentation way. As shown in FIG. 20A, an image K3 of the frame number K appears on the screen 3 of the monitor TV 2. The image K3 is overlapped or superimposed with another image K4 as shown in FIG. 20B. The image K4 portrays an enlarged image K3. Thereafter, the original image K3 is erased as shown in FIG. 20C.

Figure 12:
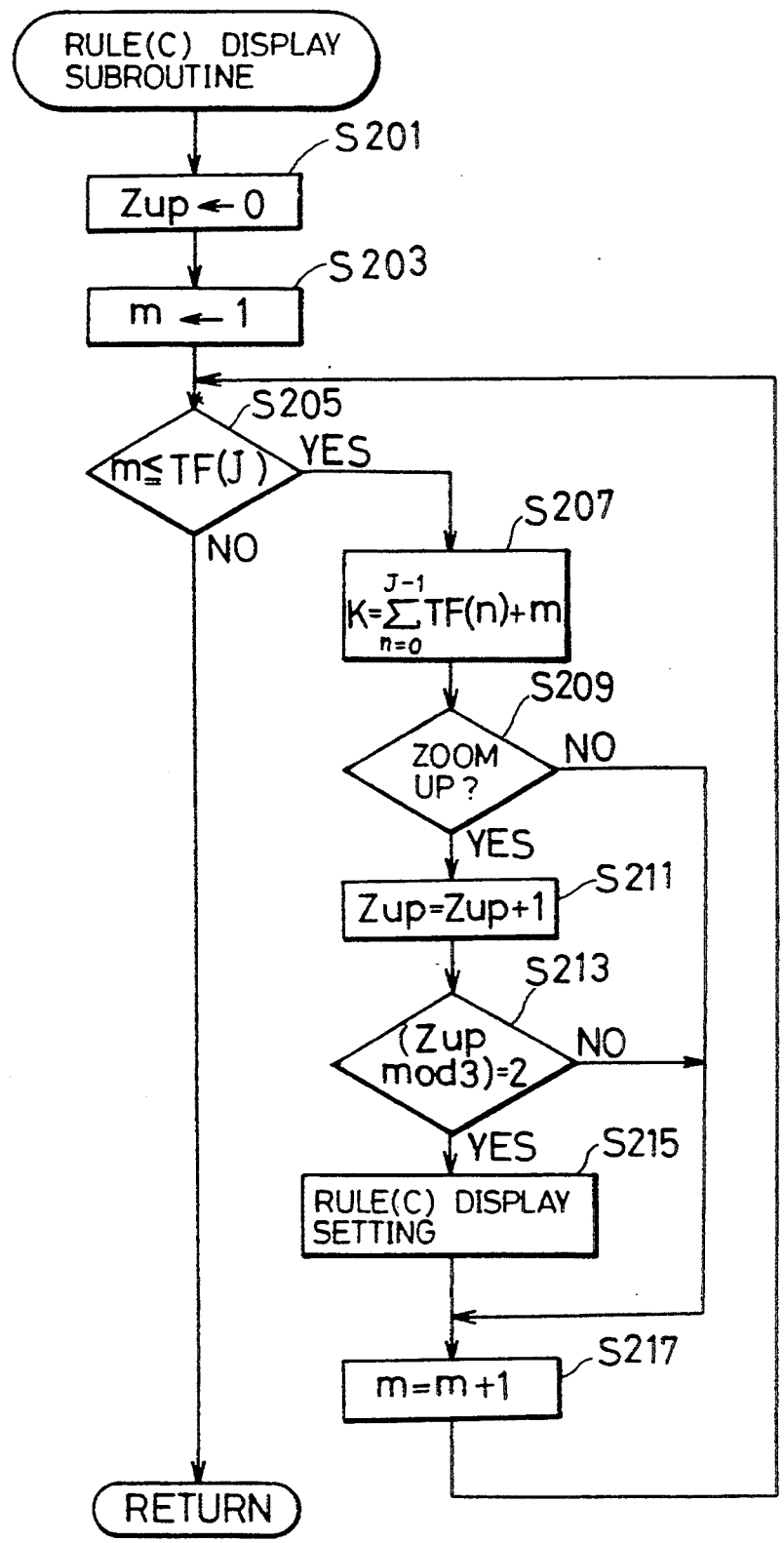
FIG. 12 is a flowchart showing a "RULE (C) DISPLAY" subroutine.

Returning to the flowchart of FIG. 12, the variable m is incremented in Step S217 and the CPU 16 returns to Step S205. When the judgments is NO in Steps S209 and S213, the CPU 16 directly proceeds to Step S217. In this way, the procedure of Steps S207–S217 is repeated until the variable m exceeds TF(J). If the variable m exceeds TF(J) in Step S205, the CPU 16 ends this subroutine and returns to Step S29 of FIG. 6.

With this procedure, it becomes possible to prevent the presentation way from being monotonous. Although this procedure changes the display of the zoom motion, it is needless to say that other motion such as panning and tilting can be changed in the same way.

Figure 13:
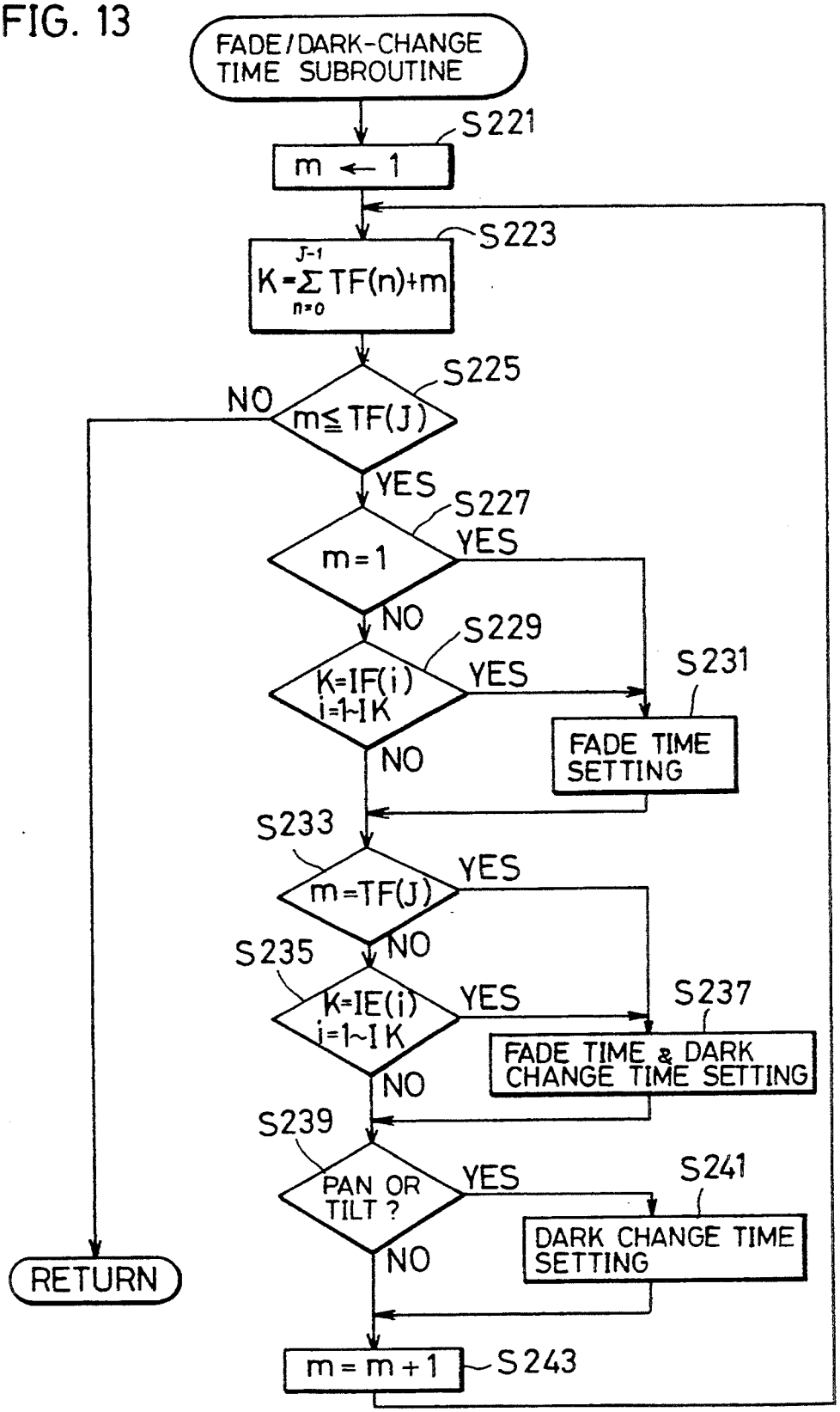
FIG. 13 is a flowchart showing a "FADE/DARK-CHANGE TIME" subroutine.

The "FADE/DARK-CHANGE TIME" subroutine of Step S31 will be explained in detail with reference to a flowchart of FIG. 13.

In Step S221, the variable m is set to "1". Next, in Step S223, a frame number K to be adopted a presentation way is determined in accordance with EQUATION (1). Then, in Step S225, the CPU 16 makes a judgment as to whether or not the variable m is equal to or less than TF(j), the total frame number of the present theme block J. If the variable m is equal to or less than "TF(J)", the CPU 16 proceeds to Step S227 to make a judgment as to whether or not the variable m is identical with "1". If the variable M is not identical with "1", the CPU 16 proceeds to Step S229 to make a judgment as to whether or not the specified frame number K is identical with the first frame numbers IF(i) of respective image blocks, where i=1, 2, . . . , Ik.

If the specified frame number K is identical with the first frame numbers IF(i) in Step S229 or if the variable m is identical with "1" in Step S227, the CPU 16 proceeds to Step S231 to set the fade time with reference to the presentation reference table 166. The display speed P2(K) is a factor to decide the-fade time and the display time.

The display speed P2(K) is, for example, determined in accordance with TABLE 7 stored in the presentation reference table 166.

TABLE 7

|  | Fade | | Dark-change | |
| --- | --- | --- | --- | --- |
|  | In | Out | Pan, Tilt | Others |
| First Frame of Image Block | Ti4 | Ti1 | Ti1 | 0 |
| Last Frame of Image Block | Ti1 | Ti4 | Ti3 | Ti3 |
| First Frame of Theme Block | Ti4 | Ti1 | Ti1 | 0 |
| Last Frame of Theme Block | Ti1 | Ti4 | Ti2 | Ti2 |
| Others | Ti1 | Ti1 | Ti1 | 0 |

0 < Ti1 < Ti2 < Ti3 < Ti4

Let us suppose that the specified frame number K is the first one in the theme block or image block. The image of this frame number K fades in with a long fading in time T14 and fades out with a short fade-out time T11. On the contrary, if the specified frame number K is the last one in the theme block or image block, the image of this frame number K fades in with a short fade-in time T11 and fades out with a long fade-out time Ti4.

Returning to Step S229, if the specified frame number K is not identical with any of IF(i), the CPU 16 proceeds to Step S233 to make a judgment as to whether or not the variable m is identical with TF(J). Namely, it is discriminated in Step S233 if the frame number K is the last one of the present theme block J. Subsequently, if the judgment of Step S233 is NO, the CPU 16 proceeds to Step S235 to further make a judgment as to whether or not the specified frame number K is identical with the last frame numbers IE(i) of blocks, where i=1, 2, . . . IK. If the number K is not identical with the last frame numbers IE(i), the CPU 16 proceeds to Step S239. Meanwhile, if the variable m is identical with TF(j) in Step S233 or if the specified frame number K is identical with the last frame numbers IE(i), the CPU 16 proceeds to Step S237 to set the fade time and dark change time. In more details, the disappearing speed P5(K) and the dark-change time P6(K) are adjusted in accordance with the table 7.

Let us now suppose that the specified frame number K is the last one in the image block. The image of this frame fades out with a long fade-out time Ti4, accompanying the dark change time of T13 before the next frame is reproduced.

Next, in Step S239, the CPU 16 makes a judgment as to whether or not the panning or tilting motion is set. If the panning or tilting motion is set the CPU 16 proceeds to Step S241 to adjust the dark change time. That is, the dark-change time P6(K) is modified in accordance with TABLE 7.

For example, an image of the last frame of the theme block including a panning presentation is reproduced with the dark change time of Ti2.

If the judgment of Step S239 is NO, the CPU 16 proceeds to Step S243 to increment the variable m. Thereafter, the CPU 16 returns to Step S223 and specifies the next frame number K. Then, the procedure of Steps S223-S243 is repeated until the variable m exceeds TF(J). If the variable m exceeds TF(J), the CPU 16 ends this subroutine and returns to Step S33 of FIG. 6.

With this procedure, it becomes possible to clearly distinguish the beginning or ending of each theme block or image block over others because the fade or dark change time is differentiated from others.

Figure 14:
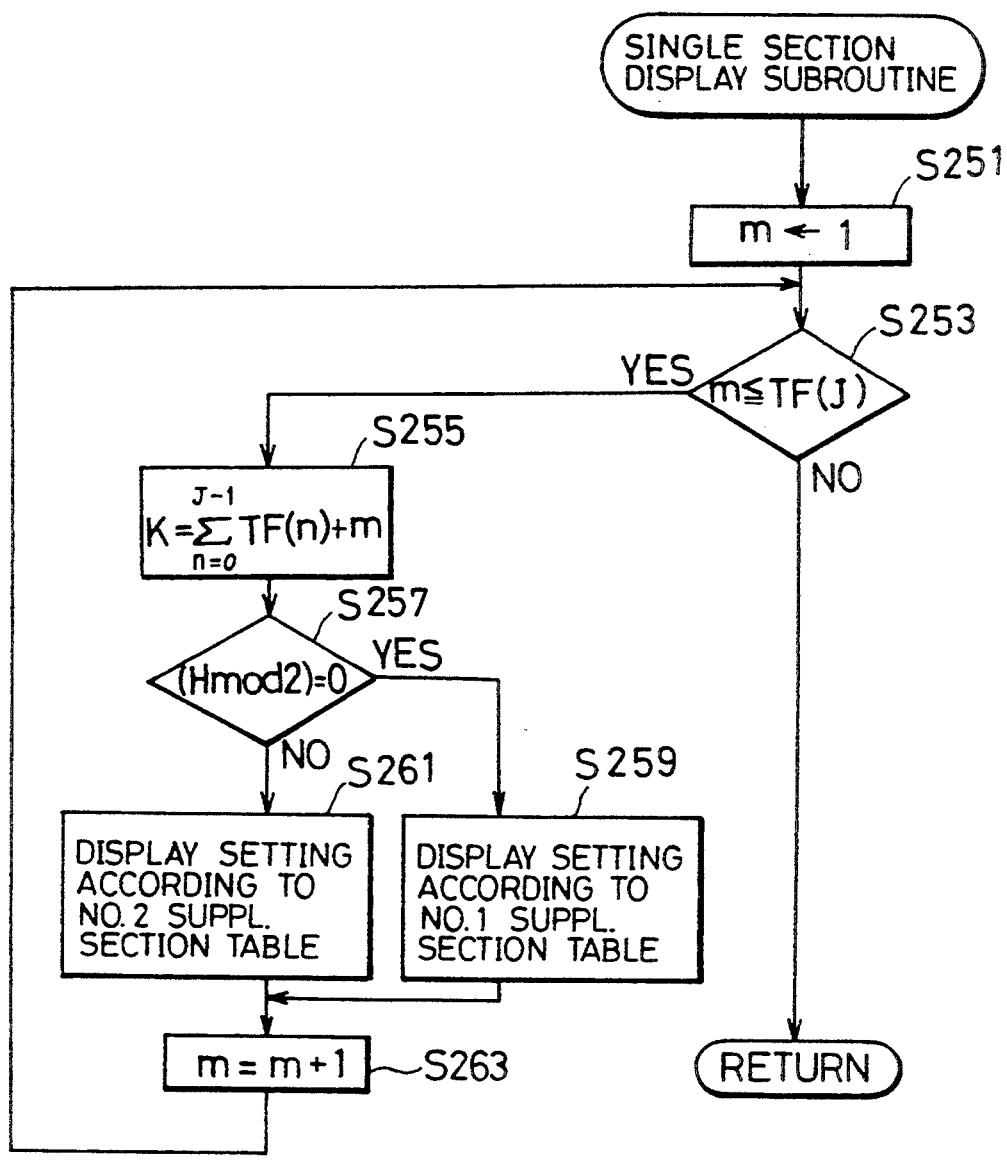
FIG. 14 is a flowchart showing a "SINGLE SECTION DISPLAY" subroutine.

The "SINGLE SECTION DISPLAY" subroutine of Step S35 will be explained in detail with reference to a flowchart of FIG. 14.

First, in Step S251, the variable m is set to "1". Then, in Step S253, the CPU 16 makes a judgment as to whether or not the variable m is equal to or less than TF(J), the total frame number of the present theme block J. If the variable m is equal to or less than "TF(j)", the CPU 16 proceeds to Step S255 to specify a frame number K to be adopted a presentation way in accordance with EQUATION (1) .

Next, in Step S257, the count value H is divided by 2 to obtain the remainder. The CPU 16 makes a judgment as to whether or not the remainder is "0". If the remainder is "0" in Step S257, the CPU 16 proceeds to Step S259 to execute a first display presentation for the supplementary section by determining the values of P1(K)-P6(K) with reference to the presentation reference table 166.

TABLE 8 shows one example of the first presentation way for the supplementary section.

TABLE 8

| Nor. & Hor. | Nor. & Ver. | Pano. & Hor. | Pano. & Ver. |
| --- | --- | --- | --- |
| Fade In | Fade In | Fade In | Fade In/Tilt |
| 5 sec Pause | 5 sec Pause | 5 sec Pause |  |
| Fade Out | Fade Out | Fade Out | Fade Out/Tilt |

Let us suppose that an image is taken by the normal setting with horizontal camera position. In this case, the image fades in the screen 3 of the monitor TV 2, then pauses five seconds, and finally fades out.

Meanwhile, if the judgment of Step S257 is NO, the CPU 16 proceeds to Step S261 to execute a second display presentation for the supplementary section by determining the values of P1(K)-P6(K) with reference to the presentation reference table 166.

TAble 9 shows one example of the second presentation way for the supplementary section.

TABLE 9

| Nor. & Hor. | Nor. & Ver. | Pano. & Hor. | Pano. & Ver. |
| --- | --- | --- | --- |
| Overlap In | Overlap In | Overlap In | Fade In/Tilt |
| 5 sec Pause | 5 sec Pause | 5 sec Pause |  |
| Overlap Out | Overlap Out | Overlap Out | Fade Out/Tilt |

Let us suppose that an image is taken by the normal setting with horizontal camera position. In this case, the image appears on the screen 3 of the monitor TV 2, overlapping with the preceding image. Then, the image pauses five seconds and finally disappears from the screen 3 overlapping with the succeeding image.

Thereafter, the variable m is incremented in Step S263 and the CPU 16 returns to Step S253. Then, the procedure of Steps S253-S263 is repeated until the variable m exceeds TF(J). If the variable m exceeds TF(J), the CPU 16 ends this subroutine and returns to Step S37 of FIG. 6.

With this procedure, it is possible to prevent the presentation way of the supplementary section from becoming monotonous.

Figure 15:
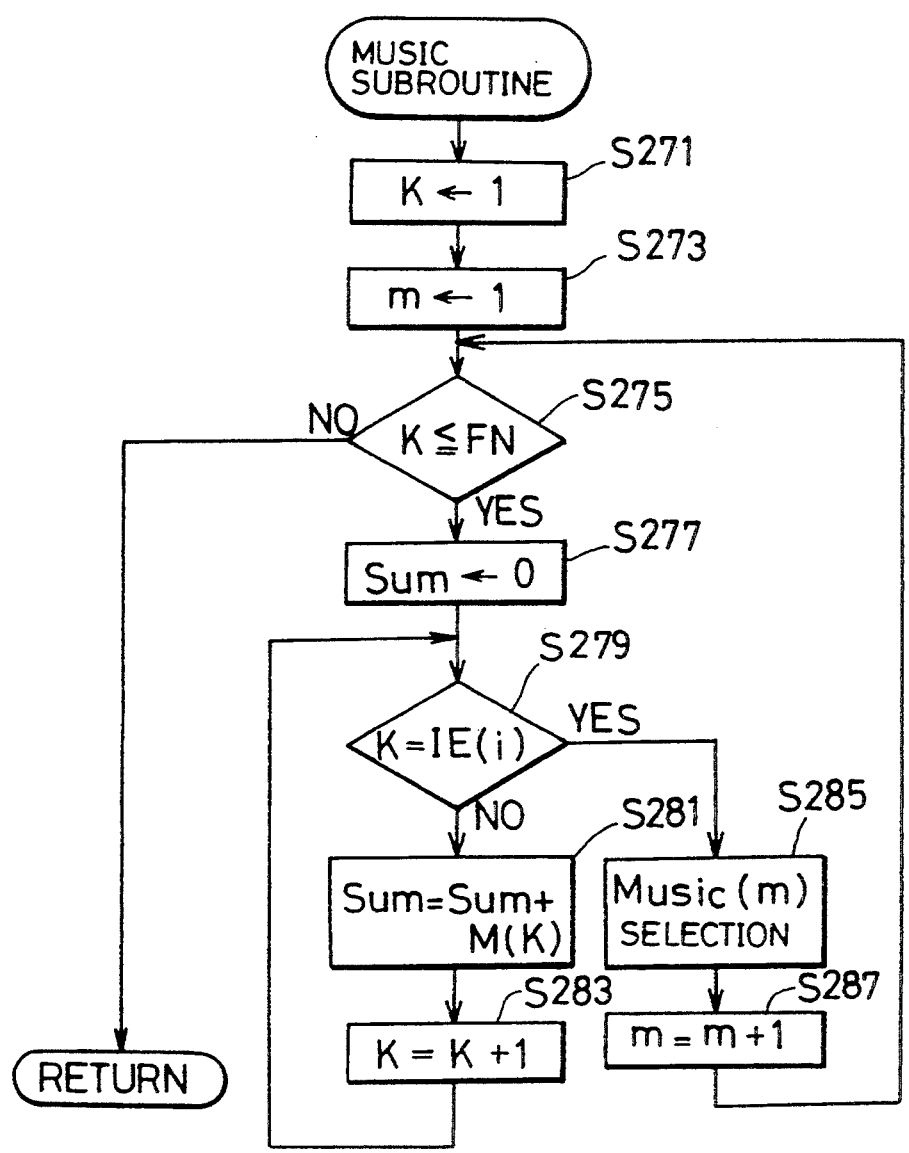
FIG. 15 is a flowchart showing a "MUSIC" subroutine.

The "MUSIC" subroutine of Step S39 will be explained in detail with reference to a flowchart of FIG. 15.

In Step S271, the frame number K is set to "1". Then, in Step S273, the variable m is set to "1". Subsequently, the CPU 16 proceeds to Step S275 to make a judgment as to whether or not the frame number K is equal to or less than FN, the total frame number of the film F. If the frame number K is equal to or less than FN, the CPU 16 proceeds to Step S277 to reset a value of a play time Sum to "0". This play time Sum denotes a play time of one music.

Next, the CPU 16 proceeds to Step S279 to make a judgment as to whether or not the specified frame number K is identical with the last frame numbers IE(i) of respective image blocks, where i=1, 2, . . . IK. If the specified frame number K is not identical with the last frame numbers IE(i), the CPU 16 proceeds to Step S281. In Step S281, a play time M(K) corresponding to a time required for the presentation way, is obtained in accordance with the display speed P2(K), disappearing time P5(K), and dark change time P6(K) of the specified frame. This play time M(K) is added to the play time Sum.

Subsequently, the frame number K is incremented in Step S283. The CPU 16 returns to Step S279 and repeats the procedure of Steps S279-S283 until the frame number K coincides with IE(i).

If the frame number K coincides with IE(i) in Step S279, the CPU 16 proceeds to Step S285 to select one music. i.e.. Music (m). from the music memory circuit 14. This music has a play time which is most closest to Sum. After that the variable m is incremented in Step S287 and the CPU 16 returns to Step S275 to repeat the procedure of Steps S277-S287. If the frame number K exceeds FN in Step S275. the CPU 16 ends this subroutine and returns the main routine of FIG. 6.

In this way, an appropriate background music is selected in connection with each image block.

Figure 16:
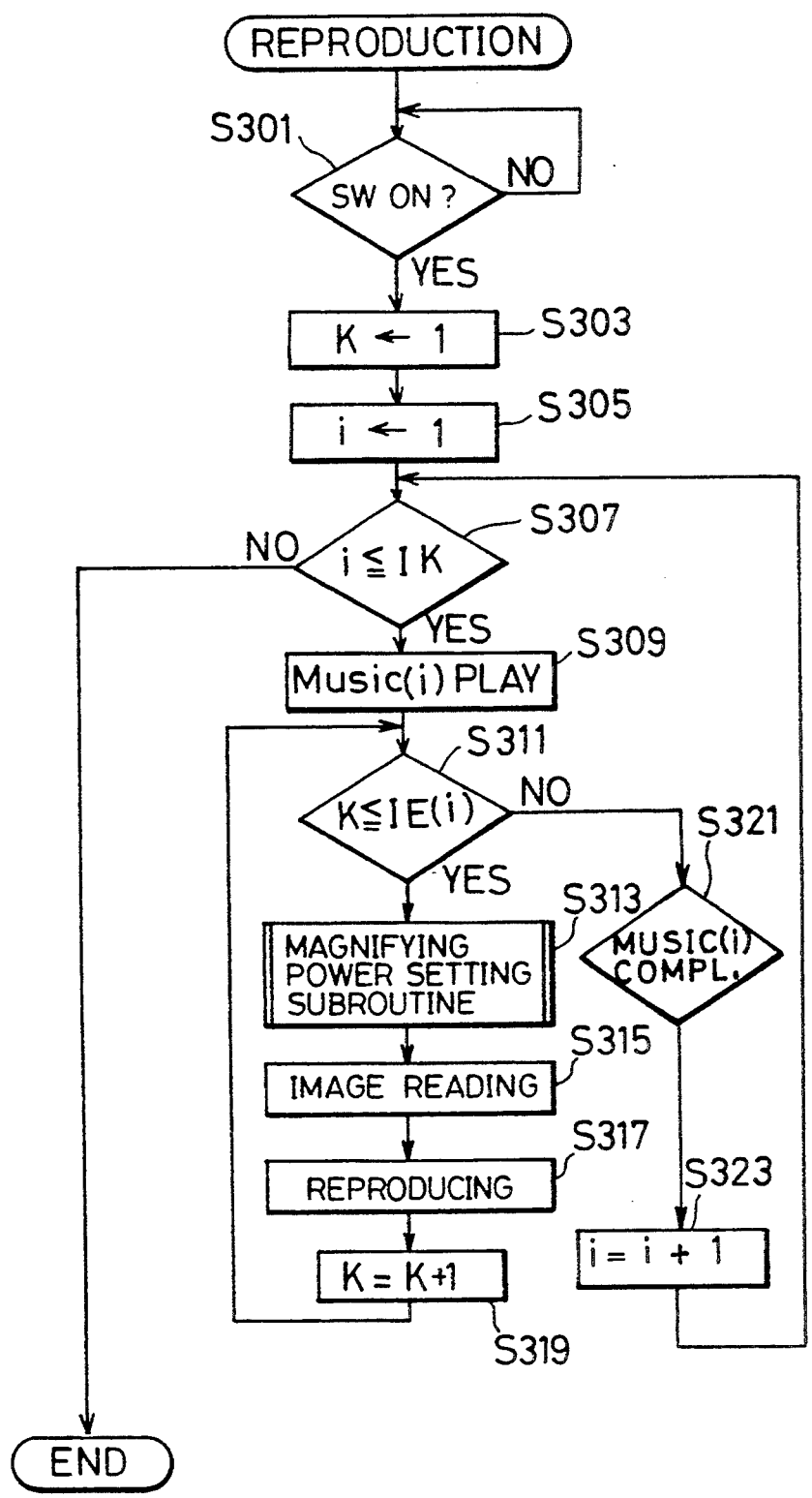
FIG. 16 is a flowchart showing a main routine for executing a reproduction.

The reproduction of photographed images will be explained in detail with reference to a flowchart of FIG. 16. The film loading detecting switch 113 detects the presence of the film cartridge FK loaded in the cartridge loading portion 5. In this condition, the CPU 16 waits the turning-on manipulation of the start switch 73 by repeating a judgment of Step S301 as to whether or not the start switch 73 is depressed.

If the start switch 73 is turned on the frame number K and an image block number i are set to "1", respectively, in Steps S303 and 305. Subsequently, the CPU 16 makes a judgment in Step 307 as to whether or not the image block number i is equal to or less than IK , the total number of the image blocks. If the number i is equal to or less than IK, the CPU 16 proceeds to Step S309 to start the play of the Music (i) having been selected in Step S285 of FIG. 15.

Next, the CPU 16 proceeds to Step S311 to make a judgment as to whether or not the specified frame number K is equal to or less than the last frame numbers IE(i) of respective image blocks, where i=1, 2, . . . IK. If the specified frame number K is equal to or less than the last frame numbers IE(i), the CPU 16 proceeds to Step S313 to execute a "MAGNIFYING POWER SETTING" subroutine which will be described later.

Subsequently, in Step S315, an image is read out from the film F through the image reading circuit 110. In Step S317, the image is reproduced on the screen 3 of the TV monitor 2. The reproduction of the images is carried out on the basis of the presentation ways defined by P1(K)–P6(K) as well as the magnifying power having been set in Step S313. Thereafter, in Step S319, the frame number K is incremented. The CPU 16 returns to Step S311 and repeats the same procedure with respect to the next frame.

If the frame number K exceeds IE(i), the CPU 16 proceeds to Step S321 to checks as to whether the play of Music (i) has been completed, and proceeds to Step S323 to increment the image block number i after the completion of play of Music (i), and returns to Step S307. In this way. the completion of play of Music (i) is made to coincide with the completion of reproduction of the images of image block i. If it is discriminated in Step S307 that the number i exceeds IK. that is, the reproduction of all the frames (K=1, 2, . . . , FN) has been completed, the CPU 16 ends this procedure.

Figure 17:
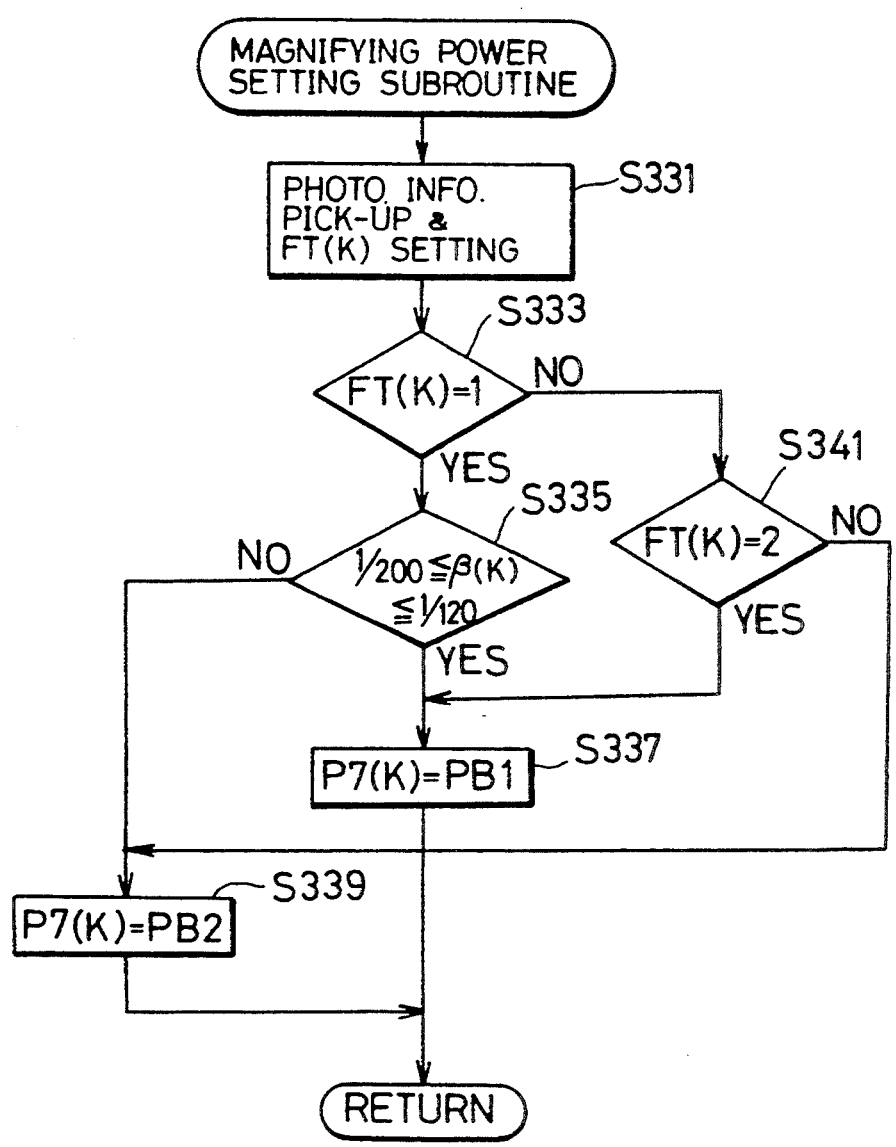
FIG. 17 is a flowchart showing a "MAGNIFYING POWER SETTING" subroutine.

The "MAGNIFYING POWER SETTING" subroutine of Step S313 will be explained in detail with reference to a flowchart of FIG. 17.

A variable FT(K) denotes a photographing condition. A condition FT(K)=1 corresponds to the normal setting with horizontal camera position, and a condition FT(K)=2 corresponds to the normal setting with vertical camera position. Furthermore, a condition FT(K)=3 corresponds to the panorama setting with horizontal camera position, and a condition FT(K)=4 corresponds to the panorama setting with vertical camera position.

Figure 21A:
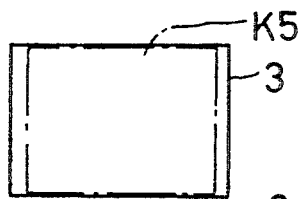
FIGS. 21A–21E are diagrams illustrating showing relationships between reproduced images and a monitor screen.
Figure 21B:
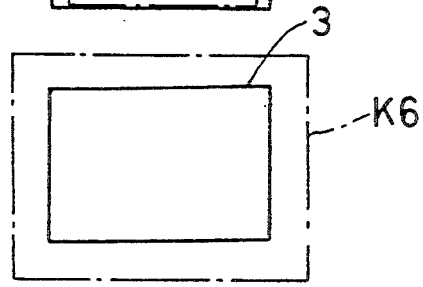
Figure 21C:
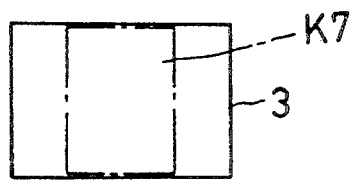

A value PB1 denotes a magnifying power by which the image is entirely displayed within an area of the screen 3 as shown in FIGS. 21A and 21C. FIG. 21A corresponds to the normal setting with horizontal camera position, in which slender margins are formed at right and left sides of the image K5. FIG. 21C corresponds to the normal setting with vertical camera position, in which relatively thick margins are formed at right and left sides of the image K7.

Figure 21D:
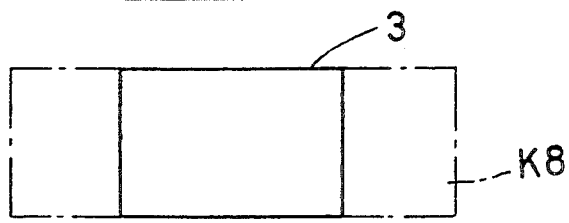
Figure 21E:
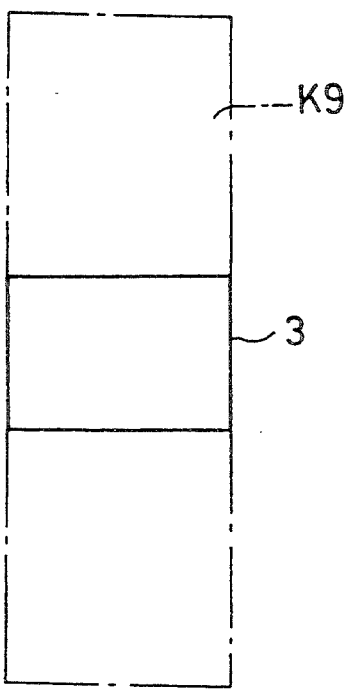

A value PB2 denotes a magnifying power by which only a part of the image is displayed on the screen 3, as shown by images K6, K8, and K9 of FIGS. 21B, 21D, and 21E.

In Step S331, the CPU 16 picks up the camera position (normal or vertical), format, magnifying power $\beta$ from the photographic information relating to the frame number K, and then sets the variable FT(K). Next, the CPU 16 proceeds to Step S333 to make a judgment as to whether or not the variable FT(K) is identical with "1" With this judgment, it is judged if the photographing condition is the normal setting with horizontal camera position.

If the variable FT(K) is equal to "1", the CPU 16 proceeds to Step S335 to further make a judgment as to whether or not the magnifying power $\beta$ is in a range of $1/200 \leq \beta \leq 1/120$, generally used for photographing a person or persons. If the magnifying power $\beta$ is in the range of $1/200 \leq \beta \leq 1/120$, the CPU 16 proceeds to Step S337 to set PB1 as a value of P7(K), so that the image K5 is entirely displayed on the screen 3 of the monitor TV 2 as shown in FIG. 21A.

If the judgment of Step S335 is NO, the CPU 16 proceeds to Step S339 to set PB2 as a value of P7(K). For example, the image K6 is partly displayed on the screen 3 as shown in FIG. 21B.

If the variable FT(K) is not equal to "1" in Step S333, the CPU 16 proceeds to Step S341 to make a judgment as to whether or not the variable FT(K) is identical with "2". With this judgment, it is judged if the photographing condition is the normal setting with vertical camera position.

If the variable FT(K) is equal to "2", the CPU 16 proceeds to Step S337. Accordingly, the image K7 is entirely displayed on the screen 3 as shown in FIG. 21C.

If the variable FT(K) is "3" or "4" in Step S341, the CPU 16 proceeds to Step S339 to Step S339. As a result, images K8 or K9 of panorama setting is partly displayed on the screen 3 as shown in FIG. 21D or 21E.

This "MAGNIFYING POWER SETTING" procedure easy-to-see display in accordance with individual photographing conditions. Furthermore, this ensures preferable panning and tilting displays.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A reproduction apparatus for reproducing an image recorded on a film comprising:
   image reproducing means for reproducing the image on the film;
   music playing means for playing a music suitable for the image;
   first determining means for determining an image reproduction time for the image reproducing means; and
   second determining means for determining a music play time for the music playing means corresponding to the image reproduction time determined by the first determining means.

2. A reproduction apparatus as defined in claim 1 wherein the music playing means has a repertoire of a plurality of musics having different play times for one another, and the second determining means selects a music having a play time corresponding to the image reproduction time determined by the first determining means.

3. A reproduction apparatus as defined in claim 1 wherein the film has photographic information about the image, and the first-determining means determines an image reproduction time based on the photographic information.

4. A reproduction apparatus as defined in claim 3 wherein the photographic information is recorded on the film.

5. A reproduction apparatus as defined in claim 3, wherein the photographic information includes a number of frames of images recorded on the film.

6. A reproduction apparatus for reproducing an image recorded on a film having photographic information about the image, the apparatus comprising:
   image reproducing means for reproducing the image on the film;
   music playing means for playing a music suitable for the image, the music playing means has a repertoire of a plurality of musics having different play times from one another;
   control means for controlling the image reproducing means and the music playing means so as to execute the image reproduction and the music play in accordance with a predetermined time relationship, the control means includes selection means for selecting a music having a play time corresponding to a time necessary to reproduce the image.

7. A reproduction apparatus for reproducing an image recorded on a film having photographic information about the image, the apparatus comprising:
   image reproducing means for reproducing the image on the film;
   music playing means for playing a music suitable for the image; and
   control means for controlling the image reproducing means and the music playing means so as to execute the image reproduction and the music play in accordance with a predetermined time relationship, the control means including calculating means for calculating an image reproduction time based on the photographic information.

8. A reproduction apparatus as defined in claim 7 wherein the photographic information is recorded on the film.

9. A reproduction apparatus as defined in claim 7, wherein the photographic information includes a number of frames of images recorded on the film.

10. A reproduction apparatus for reproducing an image recorded on a film comprising:
    image reproducing means for reproducing the image on the film;
    music playing means having a repertoire of a plurality of musics having different play times from one another for playing one music among the repertoire musics each image reproduction;
    selection means for selecting music suitable for the image; and
    determining means for determining an image reproduction time for the image reproducing means in accordance with the play time of a selected music.

* * * * *